(12) United States Patent
Chamarti et al.

(10) Patent No.: US 10,523,321 B2
(45) Date of Patent: Dec. 31, 2019

(54) MULTI-FUNCTIONAL UNITS INCORPORATING LIGHTING CAPABILITIES IN CONVERGED NETWORKS

(71) Applicant: Corning Incorporated, Corning, NY (US)

(72) Inventors: Aravind Chamarti, Ashburn, VA (US); Ulrich Wilhelm Heinz Neukirch, Painted Post, NY (US); Rajeshkannan Palanisamy, Painted Post, NY (US); Yuval Zinger, Charlotte, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/425,622

(22) Filed: May 29, 2019

(65) Prior Publication Data

US 2019/0280773 A1    Sep. 12, 2019

Related U.S. Application Data

(63) Continuation of application No. 15/819,195, filed on Nov. 21, 2017, now Pat. No. 10,348,405.

(Continued)

(51) Int. Cl.
*H04B 10/116* (2013.01)
*H04B 1/38* (2015.01)
(Continued)

(52) U.S. Cl.
CPC .............. *H04B 10/25* (2013.01); *H04B 1/00* (2013.01); *H04B 1/38* (2013.01); *H04B 10/116* (2013.01);
(Continued)

(58) Field of Classification Search
CPC combination set(s) only.
See application file for complete search history.

(56) References Cited

U.S. PATENT DOCUMENTS 8,155,525 B2   4/2012   Cox
8,558,413 B1   10/2013  Lepard
(Continued)

FOREIGN PATENT DOCUMENTS

CN   202691749 U   1/2013
CN   205261346 U   5/2016
(Continued)

*Primary Examiner* — Omar S Ismail
(74) *Attorney, Agent, or Firm* — C. Keith Montgomery

(57) ABSTRACT

Multi-functional units incorporating lighting capabilities in converged networks, and related networks and methods are disclosed. The multi-functional units are configured to be included at end points in a wireless communications network to serve as distribution points for distribution of communications services. Each multi-functional unit includes a plurality of wireless communications circuits in a single unit or housing to support multiple communications services. Thus, a single multi-functional unit can be installed in a location to support the multiple communications services to minimize installation footprint. To further conserve installation footprint, the wireless communications network can be provided as a converged network that includes a single communications backbone to converge multiple networks for the multiple communications services supported by the multi-functional units. Further, by the multi-functional units also supporting lighting capabilities, the multi-functional units may be installed in lighting fixture locations to minimize the footprint.

29 Claims, 17 Drawing Sheets

Related U.S. Application Data

(60) Provisional application No. 62/550,314, filed on Aug. 25, 2017, provisional application No. 62/424,728, filed on Nov. 21, 2016.

(51) Int. Cl.

| | | |
|---|---|---|
| *H04B 10/25* | (2013.01) | |
| *H05B 37/02* | (2006.01) | |
| *H04W 72/04* | (2009.01) | |
| *H04B 1/00* | (2006.01) | |
| *H04B 10/27* | (2013.01) | |
| *H04B 7/04* | (2017.01) | |

(52) U.S. Cl.
CPC .......... *H04B 10/271* (2013.01); *H04W 72/04* (2013.01); *H05B 37/0272* (2013.01); *H04B 7/04* (2013.01)

(56) References Cited

U.S. PATENT DOCUMENTS

| | | |
|---|---|---|
| 9,042,732 B2 | 5/2015 | Cune et al. |
| 9,215,785 B2 | 12/2015 | Huang |
| 9,232,614 B2 | 1/2016 | Hiroi |
| 9,240,835 B2 | 1/2016 | Berlin et al. |
| 9,325,429 B2 | 4/2016 | Berlin et al. |
| 9,596,029 B2 | 3/2017 | Addy |
| 10,080,178 B2 * | 9/2018 | Stapleton .............. H03F 1/3247 |
| 2007/0191075 A1 | 8/2007 | Greene et al. |
| 2007/0258202 A1 | 11/2007 | Cooley et al. |
| 2008/0197790 A1 | 8/2008 | Mangiaracina et al. |
| 2008/0220729 A1 | 9/2008 | Avila |
| 2012/0086560 A1 | 4/2012 | Ilyes et al. |
| 2012/0218978 A1 * | 8/2012 | Ishidoshiro ......... F21V 33/0052 370/338 |
| 2013/0044488 A1 | 2/2013 | Hreish |
| 2013/0188959 A1 * | 7/2013 | Cune ................ H04B 10/25753 398/96 |
| 2013/0279512 A1 | 10/2013 | Fung et al. |
| 2014/0016583 A1 * | 1/2014 | Smith ................... H04W 12/06 370/329 |
| 2015/0096352 A1 * | 4/2015 | Peterson .................. F24F 11/30 73/31.02 |
| 2015/0230320 A1 * | 8/2015 | Gritti ................ H05B 37/0245 340/12.3 |
| 2015/0259078 A1 * | 9/2015 | Filipovic ............. H04W 88/08 244/114 R |
| 2016/0037615 A1 * | 2/2016 | Davis ................. H05B 37/0272 315/291 |
| 2016/0135184 A1 * | 5/2016 | Zavadsky ................ H04B 7/04 370/329 |
| 2016/0381699 A1 * | 12/2016 | Rubin ................ H04L 67/2809 370/329 |
| 2017/0139033 A1 * | 5/2017 | Lydecker .................. G08B 5/36 |
| 2018/0295632 A1 * | 10/2018 | Goodman ............ H04B 1/1036 |

FOREIGN PATENT DOCUMENTS

| | | |
|---|---|---|
| WO | 2014141312 A1 | 9/2014 |
| WO | 2014184581 A1 | 11/2014 |
| WO | 2016071810 A1 | 5/2016 |

\* cited by examiner

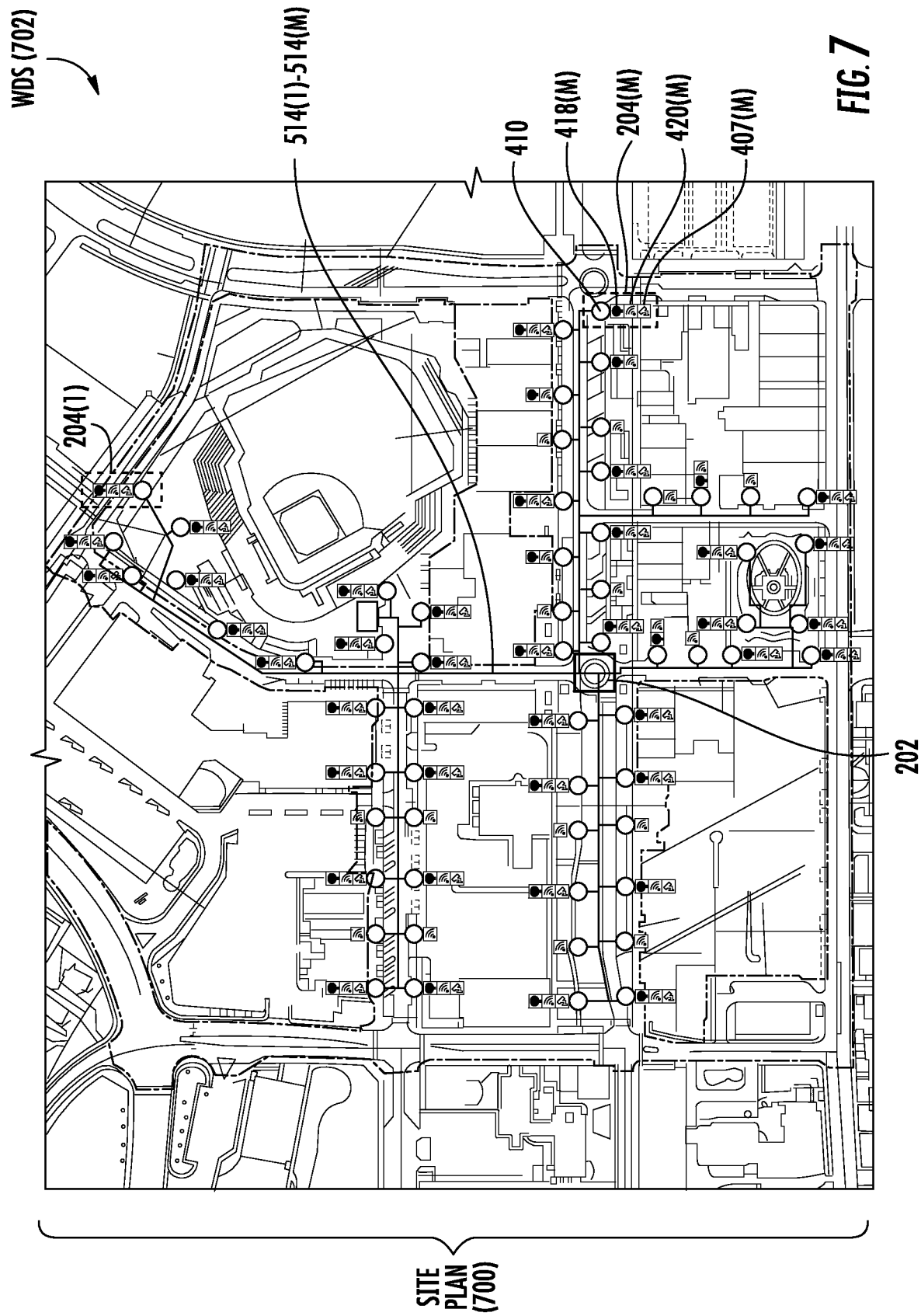

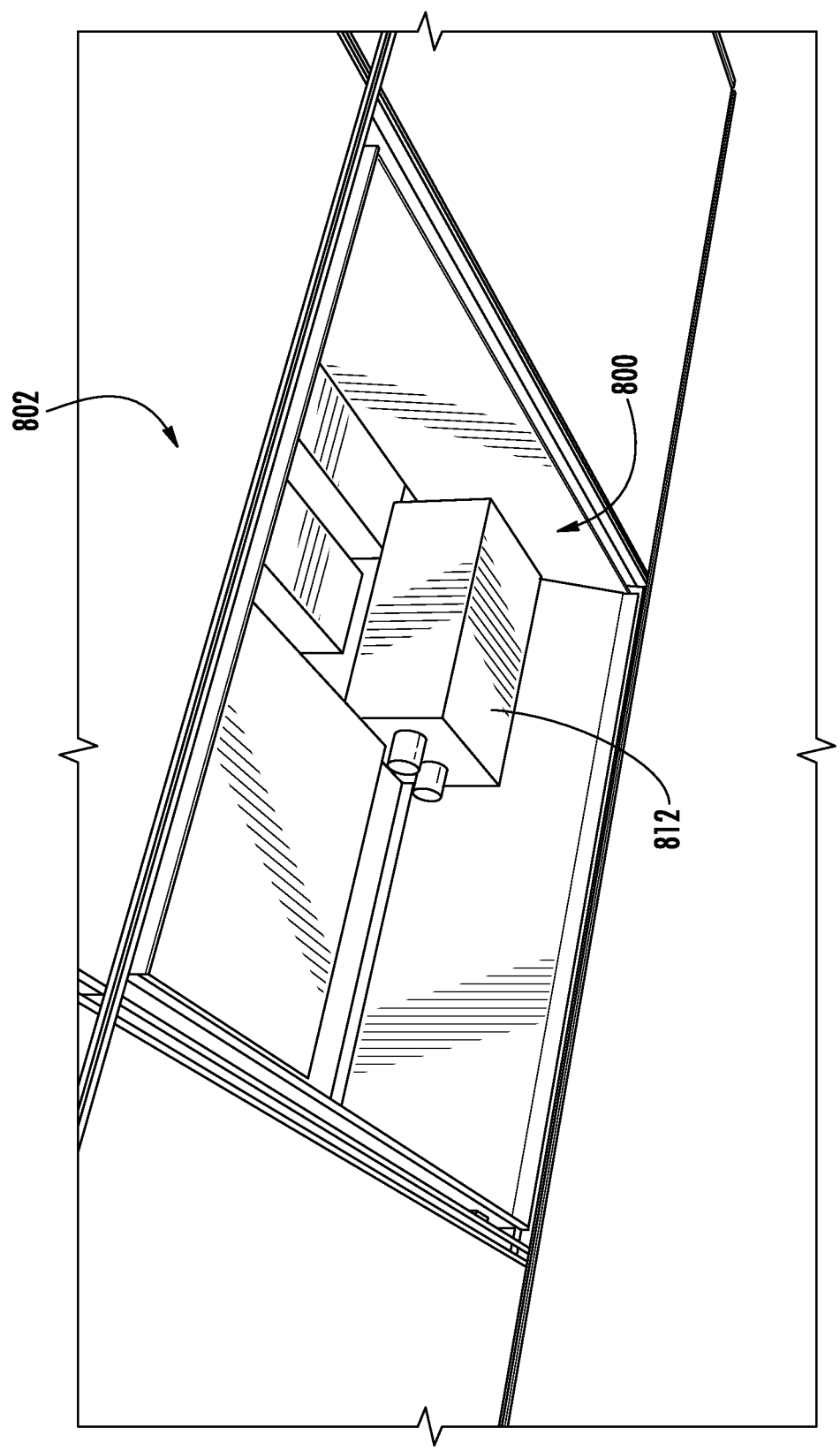

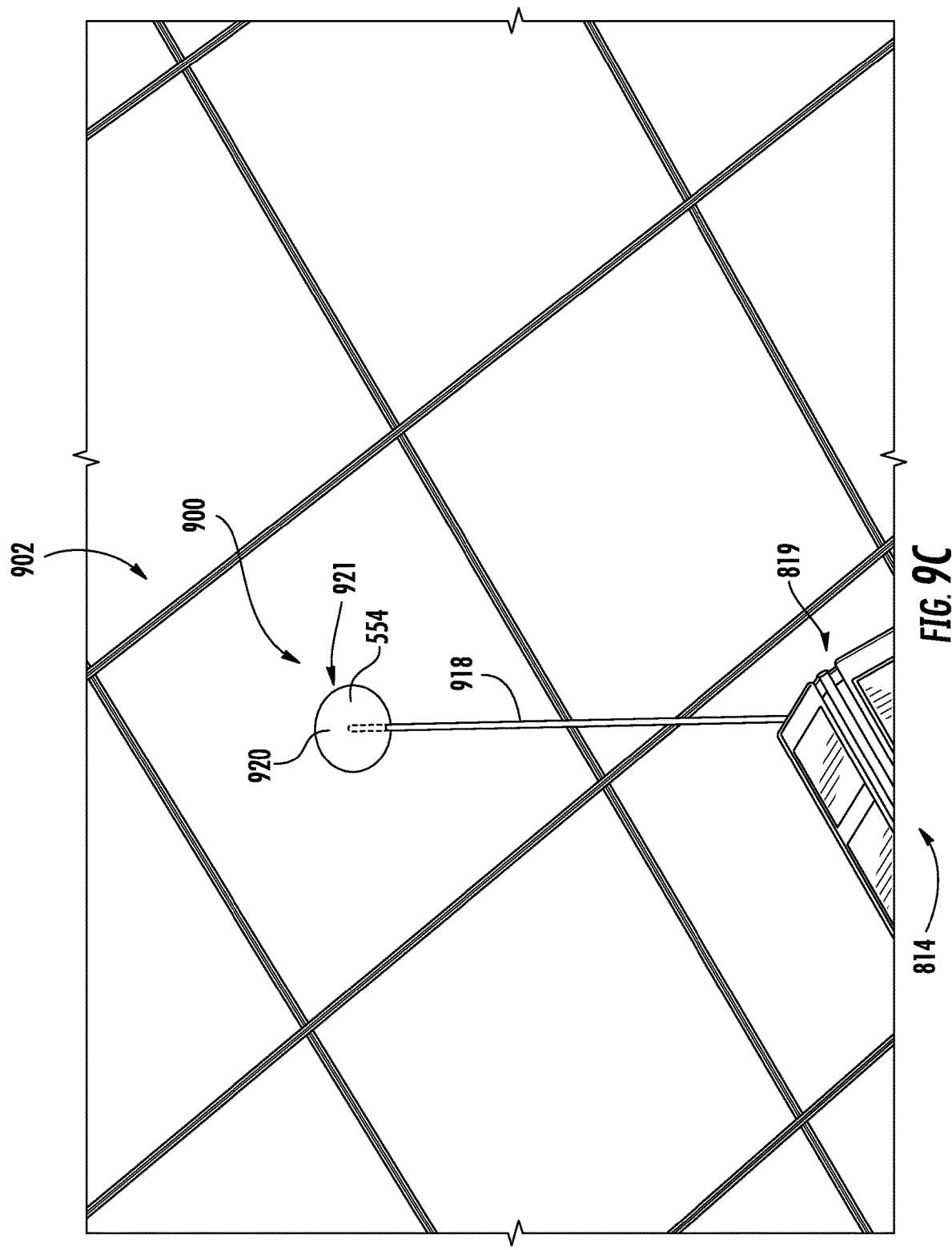

MULTI-FUNCTIONAL UNITS INCORPORATING LIGHTING CAPABILITIES IN CONVERGED NETWORKS

CROSS-REFERENCE TO RELATED APPLICATIONS

This application is a continuation of U.S. application Ser. No. 15/819,195, filed Nov. 21, 2017, which claims the benefit of priority under 35 U.S.C. § 119(e) of U.S. Provisional Application No. 62/424,728 filed on Nov. 21, 2016, and U.S. Provisional Application No. 62/550,314 filed on Aug. 25, 2017, the contents of which are relied upon and incorporated herein by reference in their entireties.

BACKGROUND

The disclosure relates generally to multi-functional units having lighting and other multi-functional communications capabilities for use in converged networks, and more particularly to wireless distribution systems that include converged communications and power networks to distribute communications data and power to these multi-functional units to provide having lighting and other multi-functional communications capabilities.

The increasing sophistication of building controls based on sensor data is an example for original building designs or building updates that provide return-of-investment through reduced energy usage. One specific, widely used example of building controls is the smart automation of lighting and heating/air conditioning control where information on room occupancy and on the influx of natural light is utilized. Such systems rely on data provided by an ever increasing number of sensors (temperature, ambient pressure, humidity, infrared (IR) signatures, microphones, etc.) which are distributed over the inside and outside of buildings. This requires networks that route data as needed between, e.g., controllers, user interfaces, actuators, and sensors.

Original building designs or building updates may also include a variety of other types of networks for different communications applications. For example, a building may include communications equipment to provide an Ethernet communications network for distribution of communications data to specific end point locations (e.g., offices, rooms, etc.). A building may also include other communications equipment for other types of networks, including but not limited to a conventional telephone network, a security network, and a heating and air conditioning (HVAC) network. Each of these networks provide for distribution of communications to communications equipment at end points in the building, also known as the network edge. This communications equipment includes power consuming components that include communications interface circuits (e.g., modems). Thus, to provide these communications networks in buildings, power must be available to the communications equipment for operation.

In this regard, FIG. 1 is a schematic diagram of exemplary network 100 providing a variety of networked services over separate communications infrastructures. The network 100 is accessed through a firewall 102 and a gateway 104, and is supported by servers 106, 108. A switch 110 provides copper Ethernet connectivity to a desktop computer 112, a printer 114, and a conventional telephone 116, and wireless connectivity via a wireless access point 118 that communicates with user devices 120. A second switch 122 is connected to another wireless access point 124 that wirelessly connects to audiovisual media 126. The second switch 122 also provides wired access to a security device 128, lighting control 130, a card reader 132, and HVAC controls 134. Electrical power for these power consuming components in the network 100 is supplied via separate local AC adaptors or via power over Ethernet (PoE) as examples.

SUMMARY

Embodiments disclosed herein include multi-functional units incorporating lighting capabilities in converged networks. Related networks and systems are also disclosed. In aspects disclosed herein, the multi-functional units are configured to be included at end points or "edges" in wireless communications networks to serve as distribution points for distribution of multiple communications services. Each multi-functional unit includes a plurality of wireless communications circuits in a single unit or housing to support the multiple communications services in the single unit or housing. Thus, for example, a single multi-functional unit can be installed in a given location to support the multiple communications services to minimize installation footprint, as opposed to installing separate communications units for each communications service. To further conserve installation footprint and costs, the wireless communications network can be provided as a converged network that includes a single communications backbone to converge multiple networks for the multiple communications services supported by the multi-functional units. Further, by the multi-functional units also supporting lighting capabilities, the multi-functional units may be installed in lighting fixture locations of a new or existing building to minimize the footprint and complexity of supporting communications services and lighting in a building. To further conserve installation footprint, the multi-functional units may include power and communications interfaces configured to be coupled to network cabling that supports both electrical power and communications signals. For example, the network cabling may be hybrid cabling that includes both electrically conducting power cables (e.g., copper wire) for carrying power (e.g., direct current (DC) power) and communications cables (e.g., optical fibers, or electrical conducting wires) for carrying communications signals to the multi-functional units to support powering the wireless communications circuits and supporting lighting components. In other aspects disclosed herein, the multi-functional units also support one or more local wired communications interfaces (e.g., category (CAT) cable) that are configured to be connected to a slave lighting component to support controlled operation and/or powering of slave lighting components from the multi-functional unit. In this manner, additional lighting components can be controlled and powered without having to install additional network cabling in the wireless communications network to a multi-functional unit.

In exemplary aspects disclosed herein, the multi-functional units each include a plurality of wireless communications circuits that each include at least one antenna unit configured to radiate wireless signals and to receive wireless signals within an antenna service area. Each wireless communications circuit can support a wireless communications service. For example, the wireless communications circuits could include a wireless access point, a wireless powering transmitter circuit, a radio frequency (RF) beacon, and/or other wireless transceivers (e.g., Bluetooth transceiver). The wireless communications network could be provided as a distributed antenna system (DAS) as an example, wherein a central unit or central communications circuit is provided to distribute communications signals received from one or more signal sources over the network cabling to the multi-functional units as remote antenna units. The wireless communications network could be also provided as a small cell network or remote radio head (RRH) network as other examples, where the communications signals are received from one or more signal sources over the network cabling at the multi-functional units as radio cells or RRH devices. The power carried by the power cables could be injected at a central location in the wireless communications network or at variation locations along the wireless communications network that are each connected to a subset of the multi-functional units in the wireless communications network. In another aspect, the multi-functional unit could be included in a combined housing along with a lighting fixture that supports the lighting components. Alternatively, the multi-functional unit could include communications housing that supports the wireless communications circuits electrically coupled to a separate lighting fixture so that the communications housing may be hidden, such as in a ceiling for example, with only the lighting fixture exposed for providing lighting.

One exemplary embodiment of the disclosure relates to a multi-functional unit for supporting lighting and communications services in a wireless communications network. The multi-functional unit comprises at least one power interface circuit configured to be coupled to at least one electrical conducting power cable to receive electrical power distributed over the at least one electrical conducting power cable. The multi-functional unit also comprises one or more communications interface circuits each configured to be coupled to at least one communications cable. The one or more communications interface circuits are each further configured to receive downlink communications signals for a plurality of communications services over the at least one communications cable from a central communications unit, and distribute uplink communications signals for the plurality of communications services over the at least one communications cable to the central communications unit. The multi-functional unit also comprises one or more wireless communications circuits each comprising at least one antenna configured to transmit received downlink communications signals comprising wireless downlink communications signals into an antenna service area associated with a wireless device, and distribute wireless uplink communications signals received over the at least one antenna as the uplink communications signals over the at least one communications cable to the central communications unit. The multi-functional unit also comprises the at least one power interface circuit further configured to be coupled to a lighting component comprising a light, to couple the electrical power to the light configured to transmit the light into a coverage area. The multi-functional unit also comprises at least one communications interface circuit among the one or more communications interface circuits configured to distribute a lighting instruction to a lighting control circuit configured to control the electrical power to the lighting component in response to the lighting instruction indicating to activate the light.

An additional exemplary embodiment of the disclosure relates to a method of controlling lighting and communications services at an edge device in a wireless communications network. The method comprises receiving electrical power from at least one electrical conducting power cable. The method also comprises receiving downlink communications signals for a plurality of communications services over at least one communications cable from a central communications unit. The method also comprises distributing uplink communications signals for the plurality of communications services over the at least one communications cable to the central communications unit. The method also comprises transmitting received downlink communications signals comprising wireless downlink communications signals over at least one antenna into an antenna service area associated with a wireless device for a communications service among the plurality of communications services in response to receiving a communications instruction from the received downlink communications signals to activate the communications service. The method also comprises distributing wireless uplink communications signals received over the at least one antenna as the uplink communications signals over the at least one communications medium to the central communications unit. The method also comprises receiving a lighting instruction from the received downlink communications signals. The method also comprises distributing the electrical power to a lighting component comprising a light configured to transmit light into a coverage area. The method also comprises distributing the lighting instruction indicating to activate the light to a lighting control circuit in the lighting component configured to control the electrical power to the light in response to the lighting instruction indicating to activate the light.

An additional exemplary embodiment of the disclosure relates to a converged network for supporting lighting and communications services. The converged network comprises a plurality of electrical conducting power cables and a plurality of communications cables. The converged network also comprises a central communications unit configured to distribute downlink communications signals over the plurality of communications cables and receive uplink communications signals over the plurality of communications cables. The converged network also comprises a plurality of multi-functional units. At least one multi-functional unit among the plurality of multi-functional units comprises at least one power interface circuit configured to be coupled to at least one electrical conducting power cable among the plurality of electrical conducting power cables to receive electrical power distributed over the at least one electrical conducting power cable. The at least one multi-functional unit also comprises one or more wireless communications circuits each comprising at least one antenna configured to transmit the downlink communications signals comprising wireless downlink communications signals received from at least one communications cable among the plurality of communications cables from the central communications unit into an antenna service area associated with a wireless device, and distribute wireless uplink communications signals received over the at least one antenna as the uplink communications signals over at least one communications cable among the plurality of communications cables to the central communications unit. The at least one multi-functional unit also comprises a lighting component comprising a light and configured to receive the electrical power to transmit the light into a coverage area of the at least one multi-functional unit. The lighting component comprises a lighting control circuit configured to receive a lighting instruction distributed in a received downlink communications signal from the at least one communications cable among the plurality of communications cables from the central communications unit and control the electrical power received from the at least one power interface circuit to the light in response to the lighting instruction. The at least one multi-functional unit also comprises one or more slave lighting components comprising one or more slave lights and each configured to receive the electrical power to transmit light into a coverage area. The one or more slave lighting components are each configured to receive a lighting instruction distributed in a received downlink communications signal from the at least one communications cable among the plurality of communications cables from the central communications unit and control the electrical power to at least one slave light in response to the lighting instruction.

An additional exemplary embodiment of the disclosure relates to a converged network for supporting lighting and communications services. The converged network comprises a plurality of electrical conducting power cables and a plurality of communications cables. The converged network also comprises a central communications unit configured to distribute downlink communications signals over the plurality of communications cables and receive uplink communications signals over the plurality of communications cables. The converged network also comprises a plurality of multi-functional units. At least one multi-functional unit among the plurality of multi-functional units comprises at least one power interface circuit configured to be coupled to at least one electrical conducting power cable among the plurality of electrical conducting power cables to receive electrical power distributed over the at least one electrical conducting power cable. The at least one multi-functional unit also comprises a plurality of wireless communications circuits each comprising at least one antenna configured to transmit the downlink communications signals comprising wireless downlink communications signals received from at least one communications cable among the plurality of communications cables from the central communications unit into an antenna service area associated with a wireless device, and distribute wireless uplink communications signals received over the at least one antenna as the uplink communications signals over at least one communications cable among the plurality of communications cables to the central communications unit. The at least one multi-functional unit also comprises a lighting component comprising a light and configured to receive the electrical power to transmit the light into a coverage area of the at least one multi-functional unit. The lighting component comprises a lighting control circuit configured to receive a lighting instruction distributed in a received downlink communications signal from the at least one communications cable among the plurality of communications cables from the central communications unit and control the electrical power received from the at least one power interface circuit to the light in response to the lighting instruction.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7 is a diagram of a site plan showing the site layout of an exemplary WDS that supports a converged network for a plurality of multi-functional units incorporating lighting capabilities located at a network edge in remote locations;

FIG. 8B is a schematic diagram of an the multi-functional unit of FIG. 8A shown installed in a ceiling;

FIG. 9C is a schematic diagram of the multi-functional unit of FIG. 9A with an additional sensor circuit as part of the multi-functional unit installed and exposed on a canopy face that supports the lighting fixture hanging from the ceiling;

DETAILED DESCRIPTION

Figure 1:
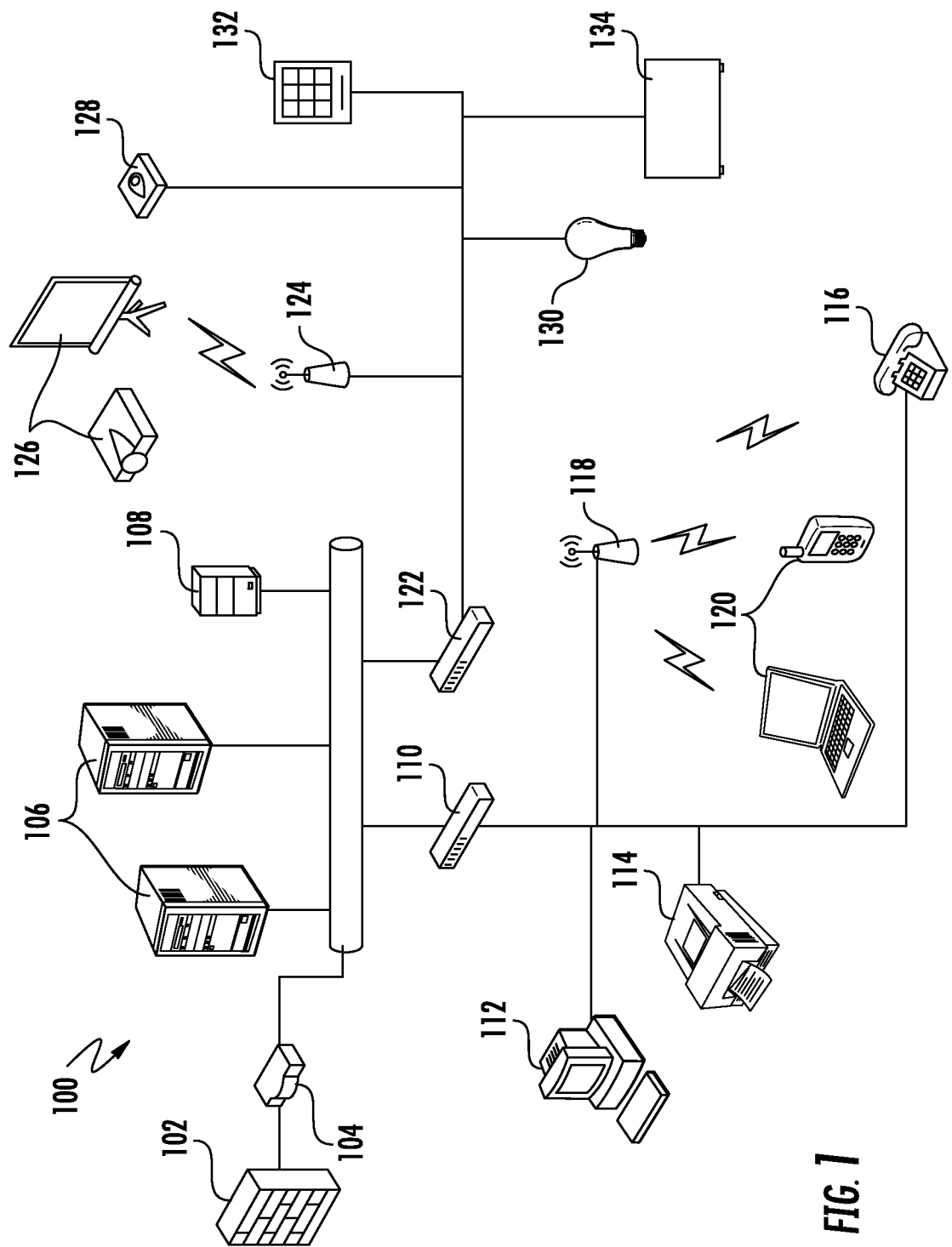
FIG. 1 is a schematic diagram of a conventional network providing services over separate network infrastructures.

Embodiments disclosed herein include multi-functional units incorporating lighting capabilities in converged networks. Related networks and systems are also disclosed. In aspects disclosed herein, the multi-functional units are configured to be included at end points or "edges" in wireless communications networks to serve as distribution points for distribution of multiple communications services. Each multi-functional unit includes a plurality of wireless communications circuits in a single unit or housing to support the multiple communications services in the single unit or housing. Thus, for example, a single multi-functional unit can be installed in a given location to support the multiple communications services to minimize installation footprint, as opposed to installing separate communications units for each communications service. To further conserve installation footprint and costs, the wireless communications network can be provided as a converged network that includes a single communications backbone to converge multiple networks for the multiple communications services supported by the multi-functional units. A communications is a part of communications network that interconnects various pieces of network, providing a path for the exchange of information between different electronic communications devices. A backbone can tie together diverse networks in the same building, in different buildings in a campus environment, or over wide areas.

Further, by the multi-functional units also supporting lighting capabilities, the multi-functional units may be installed in lighting fixture locations of a new or existing building to minimize the footprint and complexity of supporting communications services and lighting in a building. To further conserve installation footprint, the multi-functional units may include power and communications interfaces configured to be coupled to network cabling that supports both electrical power and communications signals. For example, the network cabling may be hybrid cabling that includes both electrically conducting power cables (e.g., copper wire) for carrying power (e.g., direct current (DC) power) and communications cables (e.g., optical fibers, or electrical conducting wires) for carrying communications signals to the multi-functional units to support powering the wireless communications circuits and supporting lighting components. In other aspects disclosed herein, the multi-functional units also support one or more local wired communications interfaces (e.g., category (CAT) cable) that are configured to be connected to a slave lighting component to support controlled operation and/or powering of slave lighting components from the multi-functional unit. In this manner, additional lighting components can be controlled and powered without having to install additional network cabling in the wireless communications network to a multi-functional unit.

In exemplary aspects disclosed herein, the multi-functional units each include a plurality of wireless communications circuits that each include at least one antenna unit configured to radiate wireless signals and to receive wireless signals within an antenna service area. Each wireless communications circuit can support a wireless communications service. For example, the wireless communications circuits could include a wireless access point, a wireless powering transmitter circuit, a radio frequency (RF) beacon, and/or other wireless transceivers (e.g., Bluetooth transceiver). The wireless communications network could be provided as a distributed antenna system (DAS) as an example, wherein a central unit or central communications circuit is provided to distribute communications signals received from one or more signal sources over the network cabling to the multi-functional units as remote antenna units. The wireless communications network could be also provided as a small cell network or remote radio head (RRH) network as other examples, where the communications signals are received from one or more signal sources over the network cabling at the multi-functional units as radio cells or RRH devices. The power carried by the power cables could be injected at a central location in the wireless communications network or at variation locations along the wireless communications network that are each connected to a subset of the multi-functional units in the wireless communications network. In another aspect, the multi-functional unit could be included in a combined housing along with a lighting fixture that supports the lighting components. Alternatively, the multi-functional unit could include communications housing that supports the wireless communications circuits electrically coupled to a separate lighting fixture so that the communications housing may be hidden, such as in a ceiling for example, with only the lighting fixture exposed for providing lighting.

Figure 2:
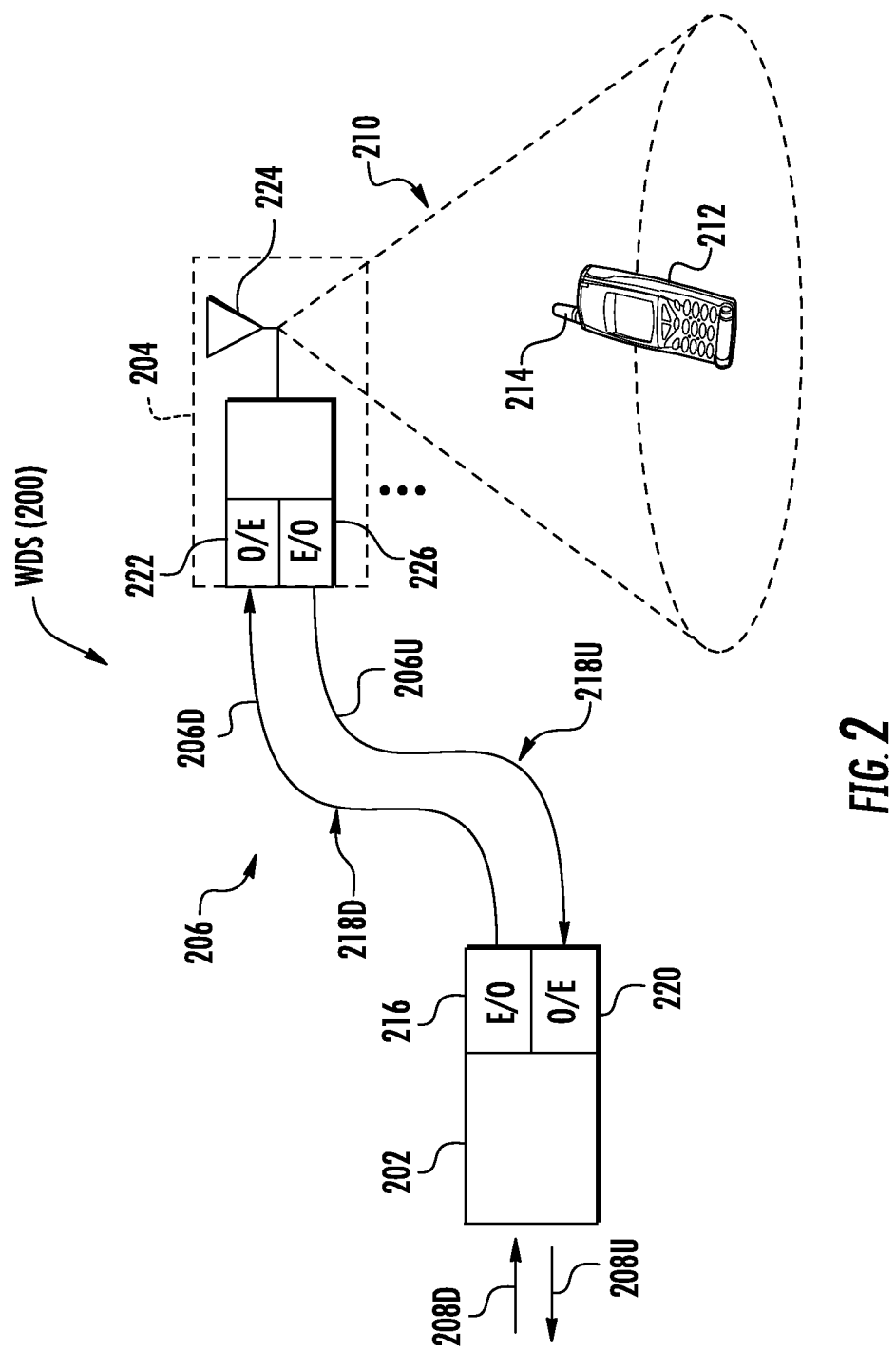
FIG. 2 is a schematic diagram of an embodiment of an exemplary optical fiber-based wireless distribution system (WDS) configured to support a converged network for a plurality of multi-functional units incorporating lighting capabilities located at a network edge in remote locations.

FIG. 2 is a schematic diagram of an embodiment of a wireless distribution system (WDS) that can support providing a wireless communications network that supports edge multi-functional units to serve as distribution points for distribution of multiple communications services and lighting. In this embodiment, the system is an optical fiber-based WDS 200 that is configured to create antenna coverage areas for establishing communications with wireless client devices located in the antenna coverage areas. The optical fiber-based WDS 200 provides RF communications services (e.g., cellular services). The WDS 200 includes head-end circuit (HEC) in the form of a central communications circuit 202, which is a head-end unit (HEU), one or more remote units in the form of multi-functional units 204, and an optical fiber cable 206 that optically couples the central communications circuit 202 to the multi-functional unit 204. In this example, the optical fiber cable 206 forms a continuous optical fiber path between the central communications circuit 202 to the multi-functional unit 204. More exemplary detail of the multi-functional units 204 will be described in more detail below starting at FIG. 4. The central communications circuit 202 is configured to receive communications over electrical downlink RF communications signals 208D from sources, such as a network or carrier, and provide such communications to the multi-functional units 204. The central communications circuit 202 is also configured to return communications received from the multi-functional units 204 via electrical uplink RF communications signals 208U, back to the source or sources. The optical fiber cable 206 includes at least one optical downlink fiber communications cable 206D that includes one or more optical fibers to carry signals communicated from the central communications circuit 202 to the multi-functional units 204 and at least one optical uplink fiber communications cable 206U to carry signals communicated from the multi-functional unit 204 back to the central communications circuit 202. The optical downlink fiber communications cable 206D and optical uplink fiber communications cable 206U may comprise one or more single mode optical fibers as an example. One optical downlink fiber communications cable 206D containing one optical downlink fiber and one optical uplink fiber communications cable 206U containing one optical uplink fiber could be provided to support multiple channels each using wavelength-division multiplexing (WDM).

The antenna coverage area or antenna service area 210 of the multi-functional units 204 forms the RF antenna service area 210 substantially centered about the multi-functional unit 204. The central communications circuit 202 is adapted to perform a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna coverage area 210 is a client device 212 in the form of a mobile device which may be a cellular telephone. The client device 212 can be any device that is capable of receiving RF communications signals. The client device 212 includes an antenna 214 (e.g., a wireless card) adapted to receive and/or send electromagnetic RF communications signals.

With continuing reference to FIG. 2, to communicate the electrical downlink RF communications signals 208D over the optical downlink fiber communications cable 206D to the multi-functional unit 204, to in turn be communicated to the client device 212 in the antenna coverage area 210, the central communications circuit 202 includes an electrical-to-optical (E/O) converter 216. The E/O converter 216 converts the electrical downlink RF communications signals 208D into optical downlink communications signals 218D to be communicated over the optical downlink fiber communications cable 206D. The multi-functional unit 204 includes an optical-to-electrical (O/E) converter 222 to convert received optical downlink communications signals 218D back into electrical downlink RF communications signals 208D to be communicated wirelessly through an antenna 224 of the multi-functional unit 204 to the client devices 212 in the antenna coverage area 210. Similarly, the antenna 224 receives wireless RF communications from the client devices 212 and communicates electrical RF communications signals representing the wireless RF communications to an E/O converter 226 in the multi-functional unit 204. The E/O converter 226 converts the electrical RF communications signals into optical uplink communications signals 218U to be communicated over the optical uplink fiber communications cable 206U. An O/E converter 220 provided in the central communications circuit 202 converts the optical uplink communications signals 218U into electrical uplink RF communications signals 208U, which can then be communicated as the electrical uplink RF communications signals 208U back to a network or other source.

Figure 3:
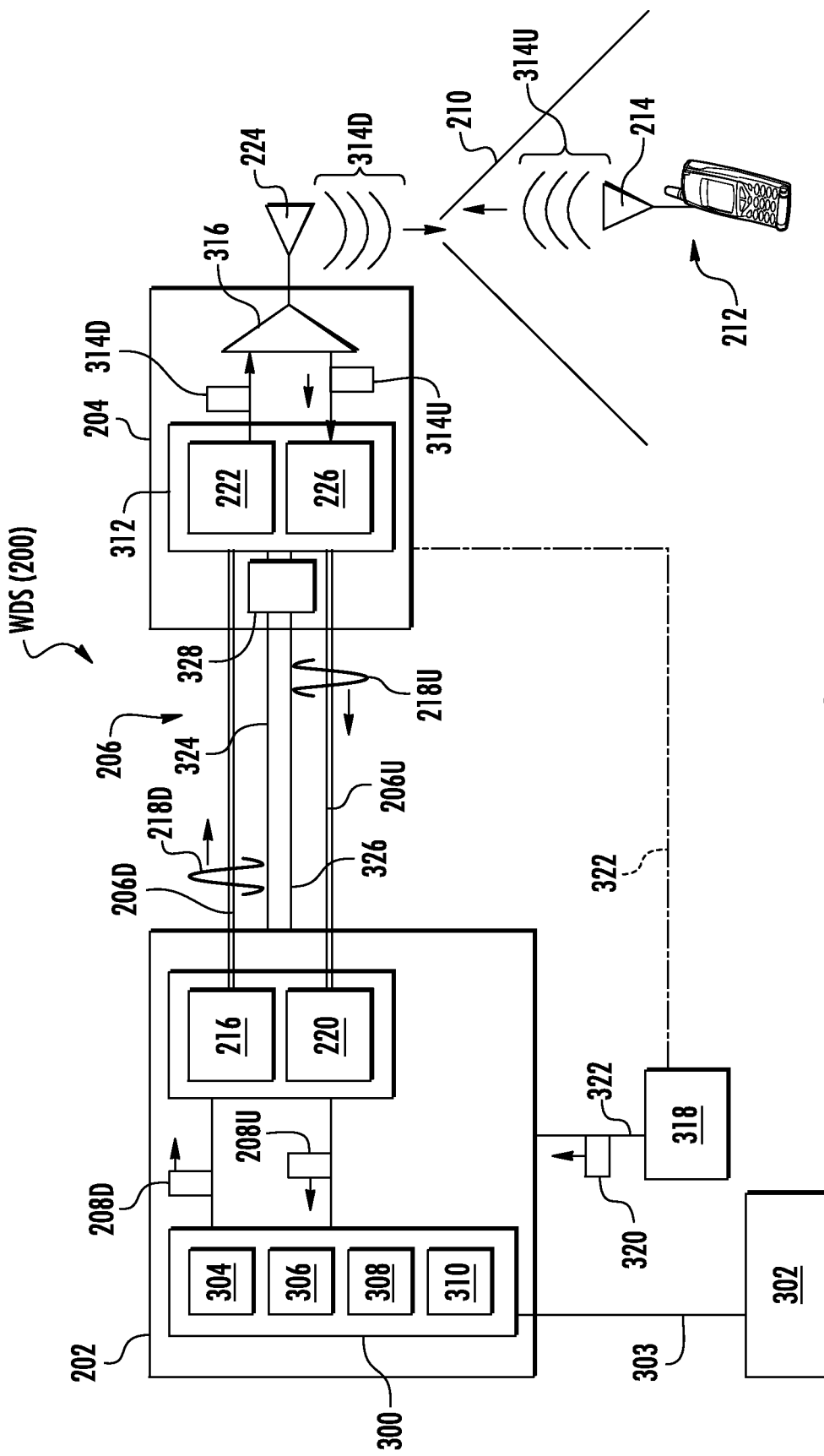
FIG. 3 is a more detailed exemplary schematic diagram of the WDS of FIG. 2.

FIG. 3 is a more detailed schematic diagram of the WDS 200 of FIG. 2. In this embodiment, the central communications circuit 202 includes a service unit 300 that provides electrical RF service signals by passing such signals from one or more outside networks 302 via a network link 303. In another embodiment, the service unit 300 provides electrical RF service signals by generating the signals directly. In another exemplary embodiment, the service unit 300 coordinates the delivery of the electrical RF service signals between client devices 212 within the antenna coverage area 210. The service unit 300 is electrically coupled to the E/O converter 216 that receives the electrical downlink RF communications signals 208D from the service unit 300 and converts them into corresponding optical downlink communications signals 218D.

The central communications circuit 202 also includes the O/E converter 220, which is electrically coupled to the service unit 300. The O/E converter 220 receives the optical uplink communications signals 218U and converts them into corresponding electrical uplink RF communications signals 208U. The service unit 300 in the central communications circuit 202 can include an RF communications signal conditioner unit 304 for conditioning the electrical downlink RF communications signals 208D and the electrical uplink RF communications signals 208U. The service unit 300 can include a digital signal processing unit ("digital signal processor" or "DSP") 306 for providing to the RF communications signal conditioner unit 304 an electrical signal that is modulated onto an RF carrier to generate a desired electrical downlink RF communications signal 208D. The DSP 306 is also configured to process a demodulation signal provided by the demodulation of the electrical uplink communications signal 208U by the RF communications signal conditioner unit 304. The service unit 300 in the central communications circuit 202 can also include a central processing unit (CPU) 308 for processing data and otherwise performing logic and computing operations, and a memory unit 310 for storing data. The multi-functional unit 204 also includes a converter pair 312 comprising the O/E converter 222 and the E/O converter 226. The O/E converter 222 converts the received optical downlink communications signals 218D from the central communications circuit 202 back into electrical downlink RF communications signals 314D. The E/O converter 226 converts electrical uplink RF communications signals 314U received from the client device 212 into the optical uplink communications signals 218U to be communicated to the central communications circuit 202. The O/E converter 222 and the E/O converter 226 are electrically coupled to the antenna 224 via an RF signal-directing element 316, such as a circulator. The RF signal-directing element 316 directs the electrical downlink RF communications signals 314D and the electrical uplink RF communications signals 314U.

With continuing reference to FIG. 3, the WDS 200 also includes a power supply 318 that generates an electrical power signal 320. The power supply 318 is electrically coupled to the central communications circuit 202 for powering the power-consuming elements therein. In an exemplary embodiment, an electrical power line 322 runs through the central communications circuit 202 and over to the multi-functional unit 204 to power the O/E converter 222 and the E/O converter 226 in the converter pair 312, the optional RF signal-directing element 316 (unless the RF signal-directing element 316 is a passive device), and any other power-consuming elements provided. The electrical power line 322 can include two wires 324, 326 that carry a single voltage and that are electrically coupled to a DC power converter 328 at the multi-functional unit 204. The DC power converter 328 is electrically coupled to the O/E converter 222 and the E/O converter 226 in the converter pair 312, and changes the voltage or levels of the electrical power signal 320 to the power level(s) required by the power-consuming components in the multi-functional unit 204.

Figure 4:
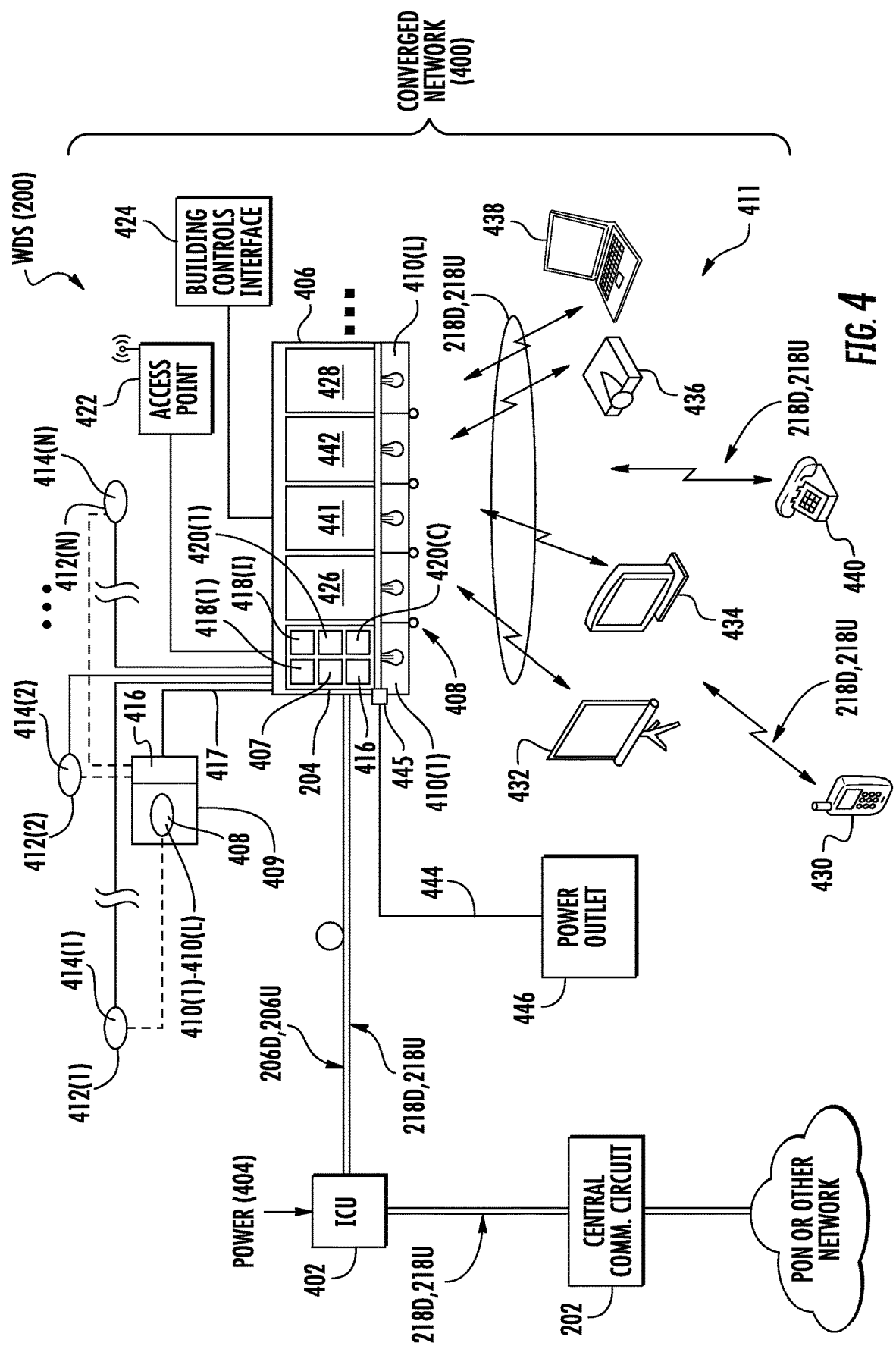
FIG. 4 is a schematic diagram of a WDS configured to support a converged network for a plurality of multi-functional units incorporating lighting capabilities located at a network edge in remote locations.

FIG. 4 is a schematic diagram illustrating additional detail of the WDS 200 in FIGS. 2 and 3 to support a converged network 400 for a plurality of multi-functional units 204 incorporating lighting capabilities located at the network edge in remote locations. In this example, the converged network 400 is a wireless communications network that supports distribution of wireless communications services. As will be discussed below, the converged network 400 is a network that provides or converges multiple communications services to be distributed over a common communications medium or cable, such as the optical downlink and uplink fiber communications cables 206D, 206U shown in FIG. 4. In FIG. 4, the converged network 400 includes the central communications circuit 202 coupled to an interconnect unit (ICU) 402, which is in turn coupled to a multi-functional unit 204. The ICU 402 is configured to receive electrical power 404 from a power source and couple the electrical power 404 to electrical conductors that are included in the optical downlink fiber communications cable 206D to distribute electrical power 404 to the multi-functional unit 204. The optical downlink and uplink fiber communications cables 206D, 206U may be supported and pass through the ICU 402 as a continuous optical fiber path between the central communications circuit 202 to the multi-functional units 204(1)-204(M). Thus, the optical downlink fiber communications cable 206D is a hybrid cable in this example. The converged network 400 provided by the WDS 200 in this example is illustrated as having a single ICU 402 and multi-functional unit 204, although it is understood that the central communications circuit 202 may connect to multiple ICUs 402 at a deployment site, and that each ICU 402 may in turn connect to multiple multi-functional units 204. The multi-functional unit 204 can include for example, an enclosure or housing 406 that houses all or a substantial number of the multi-functional unit 204 components.

In the illustrated deployment in FIG. 4, the multi-functional unit 204 includes a power interface circuit 407 that is coupled to the optical downlink fiber communications cable 206D as an electrical conducting power cable to receive the distributed electrical power 404. The power interface circuit 407 can then distribute the received electrical power 404 to the power-consuming components of the multi-functional unit 204 for operation. The multi-functional unit 204 also includes a lighting component 408 comprised of one or more lights 410(1)-410(L). In one example, the lighting component 408 can be included in the housing 406 of the multi-functional unit 204. In another example as shown in FIG. 4, the lighting component 408 can be included in a separate lighting housing 409 apart from the housing 406 of the multi-functional unit 204. The lights 410(1)-410(L) can be activated, deactivated, and dimmed/brightened under commands from the multi-functional unit 204. The lights 410(1)-410(L) are configured to transmit light into a coverage area 411. The multi-functional unit 204 is also configured to further connect to a plurality of slave lighting components 412(1)-412(N) that each include a slave light 414(1)-414(N) in this example. The slave lighting components 412(1)-412(N) are coupled to, but located outside of the housing 406 of the multi-functional unit 204. The slave lights 414(1)-414(N) can be activated, deactivated, and dimmed/brightened under commands from the multi-functional unit 204.

In one example, a lighting control circuit 416 is provided that is coupled to the power interface circuit 407 in the multi-functional unit 204 to receive electrical power 404 for operation. The lighting control circuit 416 can be included in the multi-functional unit 204 or located apart from the multi-functional unit 204 in a separate housing, such as housing 409, if the lights 410(1)-410(L) are not contained in the multi-functional unit 204. As will be discussed in more detail below, the lighting control circuit 416 can be coupled to at least one communications interface circuit 418(1)-418(I) and the lighting component 408 and/or the slave lighting component 412. The lighting control circuit 416 can be coupled to a communications interface circuit 418(1)-418(I) through a wireless connection or wired cable 417, such as an Ethernet category (CAT) cable for example (e.g., CAT 5, CAT 6, or CAT 7 cable). As will be discussed in more detail below, the communications interface circuits 418(1)-418(I) are included in the multi-functional unit 204 to support communications services received by the central communications circuit 202 in the received downlink communications signals 218D. The downlink communications signals 218D are signals for a plurality of communications services over the converged network 400. The converged network 400 is also configured to support lighting control capabilities so that the lighting control and the communications services are converged on the same converged network 400. In this regard, the lighting control circuit 416 is configured to receive a lighting instruction from a communications interface circuit 418(1)-418(I). The lighting control circuit 416 is configured to control activation of the lights 410(1)-410(L) and/or slave lights 414(1)-414(N) in the respective lighting component 408 and/or slave lighting component 412, which may include the electrical power 404 being supplied to the lights 410(1)-410(L) and/or slave lights 414(1)-414(N), in response to the lighting instruction indicated for the lights 410(1)-410(L) to be activated. For example, a communications interface circuit 418 in the multi-functional unit 204 may be a communications switch circuit, such as an Ethernet switch, or a hub communications interface circuit that is configured to route downlink communications signals 218D that can contain lighting instructions to a destination lighting control circuit(s) 416 for controlling the lighting component 408 and/or slave lighting component 412.

The multi-functional unit 204 in the WDS 200 of FIG. 4 also includes one or more wireless communications circuits 420(1)-420(C) each comprising at least one antenna configured to transmit received downlink communications signals 218D into an antenna coverage area 210 associated with a wireless device. The wireless communications circuits 420(1)-420(C) are also each configured to distribute wireless uplink communications signals 218U received over an antenna as uplink communications signals over the optical uplink fiber communications cable 206U to the central communications circuit 202. For example, a wireless communications circuit 420(1)-420(C) may be a Wi-Fi access point 422 that is part of or is connected to the multi-functional unit 204. For example, the Wi-Fi access point 422 may be configured to communicate radio signals at approximately 2.4 or 5 GigaHertz (GHz). The Wi-Fi access point 422 may be an extremely high frequency (EHF) access point that is configured to communicate radio signals at approximately 60 GHz. The EHF access point can be used to, for example, communicate with a building controls interface 424 to modify the environment of the coverage area 411. According to another embodiment, another wireless communications circuit 420(1)-420(C) may be a small radio cell circuit 426 (also known as a "small cell") that is included in the multi-functional unit 204. The multi-functional unit 204 includes additional open slots 428 to add additional components and functionalities.

Still referring to FIG. 4, a variety of client devices may be located within the coverage area 411 of the exemplary multi-functional unit 204. In one exemplary embodiment, a mobile phone 430 may access, for example, Wi-Fi, cellular, and data services through the multi-functional unit 204 and other components in the multi-functional unit 204. A smart board 432 may access Wi-Fi and WiGig signals from the multi-functional unit 204. A display 434 accesses Wi-Fi and WiGig, a projector 436 may access Wi-Fi, and a wireless docking station circuit 438 for a laptop computer may be configured to communicate with a communications interface circuit 418(1)-418(I) and/or a wireless communications circuit 420(1)-420(C) in the multi-functional unit 204 may access a variety of services including Wi-Fi, EHF, Bluetooth, and other protocols. A desk phone 440 can connect to a communications interface circuit 418(1)-418(I) and/or a wireless communications circuit 420(1)-420(C) in the multi-functional unit 204 via a wired line and/or by Wi-Fi.

Thus, in embodiments in which there is no need for a lighting fixture, a ceiling chassis could integrate sensors and other devices, and provide power and network connectivity. As some of the new features of the light fixtures mentioned above are not needed in every light fixture (but only, e.g., once per room) one can deploy one fully-featured fixture (a "hub") in one area/room and connect simpler fixtures via the connections types described above, such as in a star network topology. High throughput of the 802.11ad Wi-Fi standard (4.6 and 6.8 Gbps) requires a high-bandwidth connection to a LAN. In such embodiments, a multi-functional unit 204 may be connected via a copper Ethernet cable. At high data rates, fiber connectivity has the additional advantage of much longer cable run capability than CAT cable for example. One embodiment includes at least two different versions of multi-functional units 204, one of which having a reduced feature set since not all functionality needs to be present in all multi-functional units 204. As the data bandwidth required for these simpler multi-functional units 204 is lower, several of such components can be connected for power and data connectivity to the next fully-featured multi-functional units 204 by cable. For example, Ethernet category cable or an active optical cable can be used to connect varying multi-functional unit 204 types. Depending on the number of connected reduced feature multi-functional units 204, the power requirements for the fully featured, or "hub" fixture can be substantially increased over 100 Watts, for example.

The multi-functional units 204 can be used to effect wireless charging of devices within a coverage area. RF charging solutions may utilize multipath interference. In such applications, a charging antenna array 441 is coupled to a communications interface circuit 418(1)-418(I) and/or provided as a wireless communications circuit 420(1)-420(C) and configured to receive an RF beacon signal from the device to be charged. The relative phases between all antenna elements are measured, and a charging signal is generated using conjugate phase differences. This approach maximizes power density at the location of the device via constructive interference. The use of a compact antenna array in a single housing 406 requires strong multi-path interference in order to maximize power density at the device to be charged. Reflections off of walls act as surrogates for antennas distributed over the room. In low-interference applications, the efficiency of the power concentration drops. If antennas are distributed over multiple multi-functional units 204, the concept can be effected without or with multipath interference.

The multi-functional units 204 described herein can be used to effect infrared charging of devices within a coverage area 411. A light fixture 442 with a light-steering component can be used for IR-based charging based on line-of-sight availability with devices. The multi-functional units 204 could also be configured to distribute the received electrical power 404 remotely over an electrical conductor cable 444 to a coupled power outlet 446. For example, the multi-functional unit 204 may include a hub power interface circuit 445 coupled to the at least one power interface circuit 407, wherein the hub power interface circuit 445 is configured to receive the electrical power 404 from the power interface circuit 407. The hub power interface circuit 445 may be coupled to one or more communications interface circuits 418(1)-418(I) and configured to receive the downlink communications signals 218D from one or more communications interface circuits 418(1)-418(I) and distribute uplink communications signals 218U to the one or more communications interface circuits 418(1)-418(I).

Figure 5:
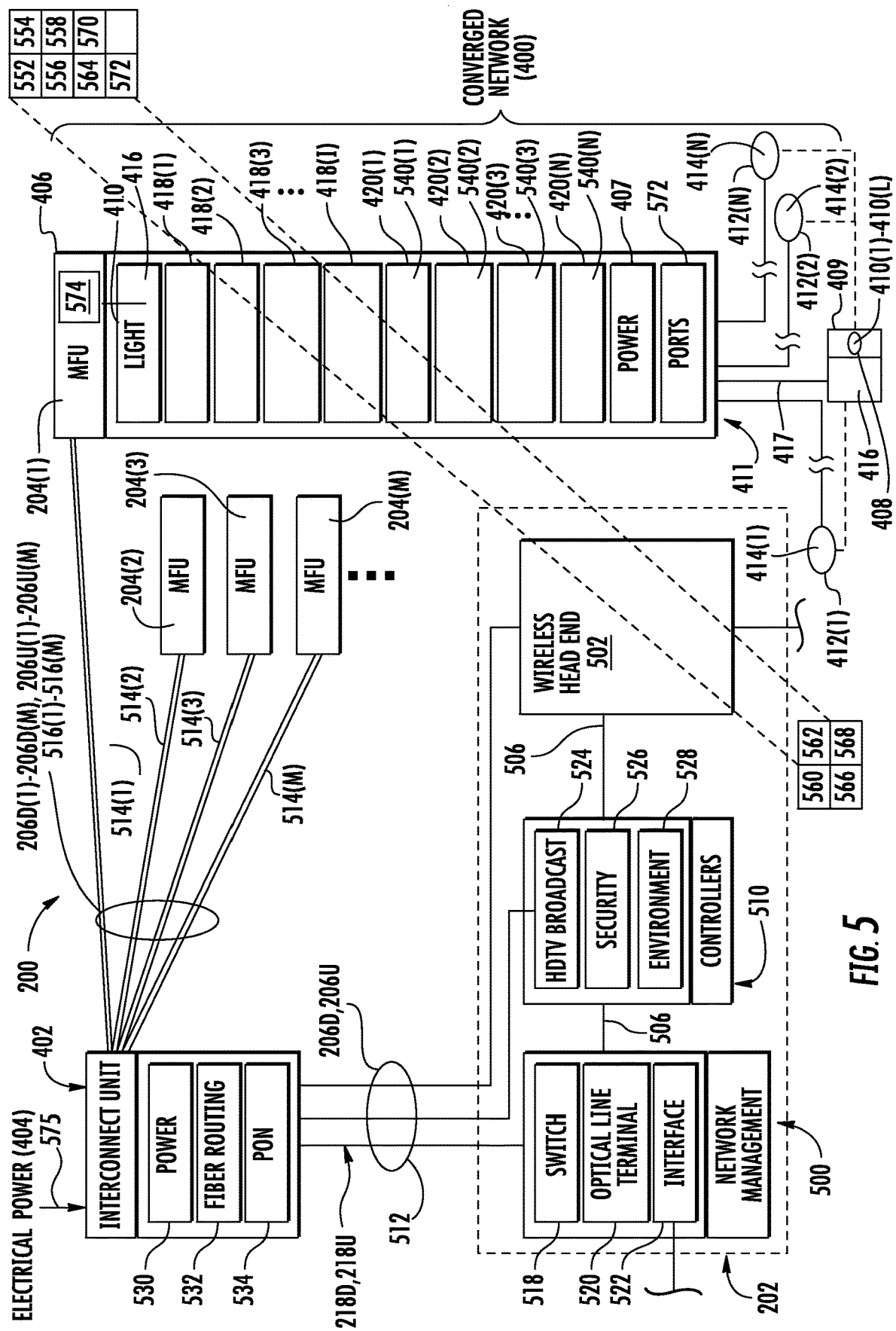
FIG. 5 is a block diagram of the WDS of FIG. 4 that supports a converged network for a plurality of multi-functional units incorporating lighting capabilities located at a network edge in remote locations.

FIG. 5 is a block diagram of the converged network 400 in FIG. 4 illustrating more exemplary detail of the multi-functional units 204 that incorporate lighting, wireless, electrical power, and additional capabilities at the network edge and the central communications circuit 202 as part of the WDS 200. Referring to FIG. 5, the converged network 400 comprises the central communications circuit 202 that provides data and traffic management, routing, monitoring, and conditioning for a number of network applications. The central communications circuit 202 includes a network management circuit 500, a wireless head-end 502, and a building management control circuit 504. The network management circuit 500, wireless head-end 502, and building management control circuit 504 can be interconnected by cables 506 or other means so that management, status, and related network information can be shared among the various network control components or circuits. The cables 506 can include metallic electrical conductors such as coaxial or category cables, optical fiber conductors, and combinations thereof.

The central communications circuit 202 is coupled to one or more interconnect units (ICUs) 402 by one or more communications cables 512, and the ICUs 402 are in turn communicatively coupled to one or more multi-functional units 204(1)-204(M) by communications cables 514(1)-514(M). In this example, the communications cables 512 include the optical downlink and uplink fiber communications cables 206D, 206U. The communications cables 514(1)-514(M) include the optical downlink and uplink fiber communications cables 206D(1)-206D(M), 206U(1)-206U(M) to be routed to the respective multi-functional units 204(1)-204(M) and an electrical conducting power cable 516(1)-516(M) to carry the electrical power 404 to the multi-functional units 204(1)-204(M). The communications cables 514(1)-514(M) can include metallic electrical conducting power cables 516(1)-516(M) such as coaxial or category cables, optical fiber conductors, and combinations thereof. The central communications circuit 202 thus has, in one embodiment, an optical path to provide uplink and downlink communications signals 218D, 218U, as well as management, monitoring, and other network control communications, to the components of the multi-functional units 204(1)-204(M). In an exemplary deployment, the central communications circuit 202 may be coupled to a plurality of ICUs 402 deployed among multiple floors of a building infrastructure, and each floor may have a plurality of multi-functional units 204(1)-204(M). For simplicity of illustration, a single ICU 402 is shown in FIG. 5.

The central communications circuit 202 is illustrated as comprising three components for clarity of illustration, although the individual components of the central communications circuit 202 can be separated into additional separate components, or combined into a single component, for example, that provides the same functionalities ascribed to the components shown in FIG. 4.

Still referring to FIG. 5, the network management circuit 500 provides general management, monitoring, configuration, and data routing capabilities to the converged network 400. The network management circuit 500 can communicate with the ICUs 402 by way of a switch 518, which may be, for example, an Ethernet switch. An optical line terminal (OLT) 520 can serve as the service provider endpoint for a passive optical network functionality of the converged network 400. The OLT 520 can, if necessary, convert electrical input signals into optical signals via E/O converters, and coordinate multiplexing for communication to and from the multi-functional units 204(1)-204(M). An Internet interface 522 allows, for example, for remote site management, monitoring, configuration, and data routing capabilities of the converged network 400.

The wireless head-end 502 provides for management, monitoring, configuration, conditioning, data routing, and other manipulation of uplink and downlink wireless communications, such as cellular (voice), and data. The connections to the ICUs 402 include all of the passive and hardware connections that the central communications circuit 202 has with the ICUs 402 (if present), and the multi-functional units 204(1)-204(M). A further example of an optical-fiber based WDS is disclosed in U.S. Pat. No. 9,042,732, the entire contents of which are incorporated by reference. A building control circuit 510 manages several functionalities associated with building maintenance, monitoring, and control. The building control circuit 510 can include, for example, an HDTV broadcast control circuit 524, a security control circuit 526, and an environment control circuit 528.

The cables 506 connecting the network management circuit 500, wireless head-end 502, and building control circuit 510 can be, for example, optical fiber cables providing optical connectivity to the ICUs 402. Electrical conductors can also be included in order to convey, for example, electrical power, command information, and/or uplink/downlink data paths. In a multi-story deployment, the optical fiber cables may be configured to extend vertically through a building infrastructure, sometimes referred to as "riser cables."

Still referring to FIG. 5, in one embodiment, the ICUs 402 include a power circuit 530 that receives electrical power 404, such as AC current, "locally," or at the site of each ICU 402. The power circuit 530 can include hardware that converts the AC current to DC current at one or more A/D converters, and provides DC current to the multi-functional units 204(1)-204(M). The power circuit 530 can include power hardware such as is disclosed in U.S. Pat. No. 8,155,525, which is hereby incorporated by reference. In another embodiment, one or more of the communications cables 512 can include electrical conductor(s) used to provide electrical power 404 from the central communications circuit 202 to one or more ICUs 402. The ICUs 402 can also include fiber routing 532 and a PON component 534 to support passive and active network functionalities in the multi-functional units 204(1)-204(M). The fiber routing 532 can include, for example, passive optical components such and optical fiber jumper cable, optical connectors, and similar components used to complete a continuous optical path from the components in the multi-functional units 204(1)-204(M) to the central communications circuit 202. The PON component 534 may include, for example, splitters to support a passive optical network infrastructure.

Each multi-functional unit 204(1)-204(M) can support a selected group of functions that are tailored to service the requirements of the deployment site. The multi-functional units 204(1)-204(M) may be modular in that only components required by the specifications of a particular deployment site need be provided upon deployment, while additional components can later be added in open slots in the multi-functional units 204(1)-204(M). The multi-functional units 204(1)-204(M) may also, for example, be deployed throughout a site, and each may include its own set of individual functionalities selected to accommodate that particular multi-functional unit 204(1)-204(M) coverage area. Because the multi-functional units 204(1)-204(M) may support a large number of functionalities, each function in a particular multi-functional unit 204(1) need not service a coverage area identical in size or availability to the other multi-functional unit 204(1)-204(M) coverage areas.

In the illustrated embodiment, the exemplary multi-functional unit 204(1) includes a power interface circuit 407 configured to be coupled to at least one electrical conducting power cable 516(1) in the communications cable 514(1) to receive electrical power 404 distributed over the electrical conducting power cable 516(1) from the ICU 402. The ICU 402 can provide, for example, DC current for powering actives in the multi-functional unit 204(1). The power interface circuit 407 can also include ports for receiving "local" power from power sources located at or near the deployment location of the multi-functional unit 204(1). If the multi-functional unit 204(1) is intended to replace a lighting fixture(s), power otherwise designated for lighting can be used to power the multi-functional unit 204(1). Power inputs from an ICU 402 and local power sources can be used separately or in combination to power different components in the multi-functional units 204(1)-204(M). The communications cables 514(1)-514(M) can be composite cables having both electrical and optical conductors to provide both electrical and optical connectivity to the multi-functional units 204(1)-204(M). The power interface circuit 407 can serve as a source of electrical power for both integrated and externally-connected devices associated with the multi-functional units 204(1). Power can be allocated to differing multi-functional unit 204(1) components at the multi-functional unit 204(1) using a local control function within the multi-functional unit 204(1), or power can be allocated as remotely instructed by the central communications circuit 202.

With continuing reference to FIG. 5, the multi-functional unit 204(1) includes the one or more communications interface circuits 418(1)-418(I). Each communications interface circuit 418(1)-418(I) is configured to receive downlink communications signals 218D(1) for a plurality of communications services over the communications cable 514(1) from the central communications circuit 202, and distribute uplink communications signals 218U(1) for the plurality of communications services over the communications cable 514(1) to the central communications circuit 202. The multi-functional unit 204(1) also includes one or more wireless communications circuits 420(1)-420(N) that are also configured to provide communications services in the form of wireless communications services. Each wireless communications circuits 420(1)-420(N) includes at least one antenna 540(1)-540(N) configured to transmit received downlink communications signals 218D into an antenna service area, and distribute wireless uplink communications signals 218(1) received over the at least one antenna 540(1)-540(N) over the at least one communications cable 514(1) to the central communications circuit 202. The wireless communications circuits 420(1)-420(N) may receive the downlink communications signals 218D(1) and distribute the uplink communications signals 218U(1) through the communications interface circuits 418(1)-418(I) as an interface to the converged network 400.

According to another embodiment, the multi-functional unit 204(1) may include at least one light 410 integral with or adjacent to the multi-functional unit 204(1). The light 410 can include, for example, LED lighting configured to illuminate office, residential, or industrial space. The multi-functional unit 204(1) can be supported within, for example, the housing 406, and the light(s) 410 can be supported on or in the housing 406 along with the other hardware, passives, and supporting structure in the housing 406. The lighting control circuit 416 is coupled to the power interface circuit 407 to receive the electrical power 404. The lighting control circuit 416 is also coupled to the communications interface circuits 418(1)-418(I), the wireless communications circuits 420(1)-420(N), the lights 410(1)-410(L), and the slave lights 414(1)-414(N). The lighting control circuit 416 is configured to receive a lighting instruction from a communications interface circuit 418(1)-418(I) and provide the electrical power 404 to a light(s) 410(1)-410(L) and/or slave light(s) 414(1)-414(N) in response to the lighting instruction indicating to activate such light(s) 410(1)-410(L) and/or slave light(s) 414(1)-414(N) in the lighting component 408 and/or the slave lighting component 412.

The power interface circuit 407 can power light components using separate applications of or combinations of power supplied from an ICU 402 or from other source(s) connected to the power interface circuit 407, such as local power sources. According to one aspect, deployment and infrastructure costs are reduced by converging multiple functions, including wireless, with a deployment site's lighting requirements. A typical example of a building's lighting and wireless deployments, for example, are based on separate and distinctly wired and controlled infrastructures. By converging the lighting function along with one or more functions as shown in FIG. 5, passive and active component, as well as associated installation and maintenance labor costs, are reduced.

An example of a communications interface circuit 418 (1)-418(I) that the multi-functional unit 204(1) can further include is a sensor circuit 552 configured to measure environmental and other conditions of the deployment site. For example, the sensor circuit 552 can include sensors that measure air quality, such as $O_2$, CO, and $CO_2$ levels for example, and/or humidity. The sensor circuit 552 can also be configured to trigger activation, dimming, and deactivation of light fixtures, either by a controller located in the multi-functional unit 204(1), or by remote instruction from an environmental circuit 554 of the building control circuit 510. Another example of a communications interface circuit 418(1)-418(I) that can be included in the multi-functional unit 204(1) is a light level sensor(s) 556 as well as room occupancy sensors that detect when occupants may benefit from more or less lighting. The multi-functional unit 204(1) can include local processing capabilities such that the multi-functional unit 204(1) can effect lighting changes independent of the central communications circuit 202. The multi-functional units 204(1)-204(M) can also receive instructions from, for example, persons located within a multi-functional unit 204(1) coverage area, such as from a wall ON/OFF or dimmer switch. One or more of the multi-functional units 204(1)-204(M) can also provide room occupancy and light level data to the central communications circuit 202 so that the central communications circuit 202 can provide remote activation/inactivation, light level adjustment instructions, etc. to each central communications circuit 202. Another example of a communications interface circuits 418(1)-418 (I) that can be included in the multi-functional unit 204(1) is a camera(s) 558 that can be incorporated in the multi-functional units 204(1)-204(M), such that a live or automated monitor can view the conditions of each coverage area serviced by the multi-functional units 204(1)-204(M), and adjust lighting according to specified parameters. The camera(s) 558 can also support security functions for a service area, as well as business or manufacturing process monitoring. Any of the sensor circuits 552 discussed above and herein and shown in FIG. 4 as included in the multi-functional unit 204 can also be contained in a separate lighting housing, such as lighting housing 409, and interfaced with a lighting control circuit 416 to control activation and/or deactivation of the light(s) 410(1)-410(L) and/or slave light(s) 414(1)-414(N).

An example of a wireless communications circuit 420(1)-420(N) that can be included in the multi-functional unit 204(1) is a location-based services (LBS) circuit 560 to support location services. The LBS circuit 560 can be of a radio frequency type using, for example, time-difference of arrival or other algorithms. Alternatively, in some environments light may be used to support LBS functions. LED lights, either separate or as part of the lighting component 408, can be used to transmit visible light used to determine the location of one or more user devices within a multi-functional unit 204(1) coverage area. LED or other lights used to support LBS can also be used to transmit data via visible light communications (VLC). Laser diodes, which have a relatively high modulation bandwidth, may also be used as light emitters for LBS or for VLC. Corning Incorporated's Fibrance® lighting technology utilizes a laser source and may be used as the (or one of several) light emitting element(s) in a multi-functional unit 204(1)-204 (M). Fibrance® enables extremely high data rates in VLC. Use of a laser source with a narrow optical spectrum for VLC also enables very effective suppression of interference from other light sources via spectral optical filtering. Another example of a wireless communications circuit 420 (1)-420(N) that can be included in the multi-functional unit 204(1) is a HDTV component 562 can include a wireless HDTV transmitter for broadcasting to HDTVs within the multi-functional unit's 204(1) coverage area.

Another example of a communications interface circuit 418(1)-418(I) that can be included in the multi-functional unit 204(1) is an optical network terminal (ONT) circuit 564 that serves to terminate an optical network. The ONT circuit 564 can, for example, demultiplex downlink communications signals into component parts (e.g., voice telephone, television, and Internet access). The ONT circuit 564 can further multiplex uplink communications signals for transmission to the central communications circuit 202.

Another example of a wireless communications circuit 420(1)-420(N) that can be included in the multi-functional unit 204(1) is a wireless remote unit 566 configured to provide wireless services in the multi-functional unit 204(1) coverage area. The remote unit 566 can include all of the hardware, passive components, and structure discussed above with reference to FIGS. 1-4. The remote unit 566 may be a remote antenna unit. However the remote unit 566 may be configured to be integral or to share a common housing or enclosure with the other components of the multi-functional unit 204(1). Power, passive cabling resources, and control functions within the multi-functional unit 204(1) can be also shared among the various components. The remote units 566 and wireless head-end 502, along with the optical and electrical infrastructure of the converged network 400, form the WDS 200 that is converged with the other functions and components of the converged network 400 and may use a common infrastructure.

Still referring to FIG. 5, the remote unit 566 forms an RF coverage area substantially centered about the multi-functional unit 204(1). The wireless head-end 502 is adapted to perform a number of wireless applications, including but not limited to Radio-over-Fiber (RoF), radio frequency identification (RFID), wireless local-area network (WLAN) communication, public safety, cellular, telemetry, and other mobile or fixed services. Client devices (shown in FIG. 4) for the remote unit 566 can be any device that is capable of receiving RF communication signals. The communication path(s) between the wireless head-end 502 and the remote unit 566 can be partially or wholly optical link(s). The optical paths shown in FIGS. 3 and 4, for example, are examples of a suitable optical infrastructure for the remote unit 566. Each remote unit 566 can include O/E and E/O converter pairs configured to convert downlink and uplink signals from and to the wireless head-end 502. Electrical power 404 for the remote unit 566 can be provided by the power interface circuit 407 which can, for example, receive DC power from the ICU 402 associated with the multi-functional unit 204(1). The WDS supports a wide variety of radio sources, such as Long Term Evolution (LTE), US Cellular (CELL), Global System for Mobile Communications (GSM), Code Division Multiple Access (CDMA), Time Division Multiple Access (TDMA), Advanced Wireless Services (AWS), iDEN (e.g., 800 MegaHertz (MHz), 900 MHz, and 1.5 GHz), etc. These radios sources can range from 400 MHz to 2700 MHz as an example. Cellular services can further include support of a personal cell network (pCell™), and as RF beacons or hubs communicating using, for example, Bluetooth and Zigbee (e.g., IEEE 802.15.4) protocols.

The remote unit 566 can connect to, or be incorporated in the multi-functional unit 204(1), "add-on" or expansion capabilities, such as are shown in U.S. Pat. Nos. 9,240,853 and 9,325,429, which are hereby incorporated by reference. The remote unit 566 antennas can include cooperative multiple-input, multiple-output (MIMO) antennas. If multi-functional units 204(1)-204(M) are sufficient in number, the multi-functional units 204(1)-204(M) can be equipped with antennas and processing capabilities to support massive MIMO.

A remote unit 566 of a particular multi-functional unit 204(1)-204(M) may be provided with a variety of capabilities selected according to deployment site requirements. For example, remote units can be configured to incorporate or to support Wi-Fi access points. In one embodiment, a remote unit supports extremely high frequency (EHF) or millimeter-wave services. One EHF service is 60 GHz IEEE standard 802.11ad, also called "WiGig." The remote units 566 can also serve as wireless access points (AP) at 2.4 GHz and 5 GHz, for example. In EHF applications, multi-functional units 204(1)-204(M) may be deployed to minimize obstructions between a multi-functional unit 204(1)-204(M) and client devices. Higher frequency radios must typically be deployed more densely than lower frequency devices. For example, 2.4 GHz and 5 GHz radios need not be as densely deployed as relatively high frequency 60 GHz radios. The deployment of multi-functional units 204(1)-204(M) can thus include multi-functional units with varying hardware capabilities so that, for example, there are no gaps in EHF coverage, or conversely, so that there is not excessive overlap in coverage at lower frequencies. Conventional multiband access points (APs) exist that combine 2.4, 5 and 60 GHz service in a single unit. Such APs could be used in sufficient number to provide coverage for 2.4 and 5 GHz, and could be supplemented, for example, by additional APs for EHF services. Alternatively, lower frequency antenna components and EHF components could be deployed as needed among selected multi-functional units as separate hardware components.

A small radio cell circuit 568 can be included within the remote unit 566 function or as a separate device. Small radio cell circuits 568 are low-powered radio access nodes that operate in licensed and unlicensed spectrums that typically have a range of 10 meters to 1 or 2 kilometers. A small radio cell circuit 568 at a remote unit 566 can service its own coverage area in addition to, as an alternative, or as a supplement to other remote unit 566 wireless features at the remote unit.

Because certain EHF frequencies propagate similarly to visible light (e.g. little or no obstruction penetration and shadowing), multi-functional units 204(1)-204(M) with lighting capabilities deployed in locations commonly used for light fixtures are ideal to support EHF antenna components. Light fixtures must be spaced so that occupied areas are well-lighted for safety and productivity reasons. Such deployments are sufficiently dense so that EFH communications can service an entire deployment site with substantially unobstructed EHF service throughout the site. EHF frequencies including 60 GHz can operate using very small antenna arrays and thus such hardware is easy to incorporate into smaller profile housings. The form factor of a multi-functional unit 204(1)-204(M) can thus be reduced.

Other examples of communications interface circuits 418 (1)-418(I) that can be included in the multi-functional unit 204(1) include an environmental control circuit 570 configured to modify the physical environment of the multi-functional unit 204(1) coverage area 411. The environmental control circuit 570 can, for example, control the coverage area's 411 temperature and humidity, as well as controlling the action of fans or other air circulation fixtures servicing the coverage area. Environment sensors of the sensor circuit 552 can provide input to the environmental circuit 554, or alternatively or in addition to the environmental control circuit 570. The building control circuit 510 can then instruct the environmental control circuit 570 on how to modify the environment. The environmental control circuit 570 can effect changes through wired or wireless connections to air conditioning unit dampers, fans, and/or heating and cooling unit. Examples of environmental control circuits 570 include, but are not limited to temperature sensors, occupancy sensors, and air quality sensors.

Multi-functional units 204(1)-204(M) can have additional ports 572 that allow additional hardware and passives to be connected to any multi-functional unit 204(1)-204(M). The ports 572 can be electrical or optical, and a plurality of such undedicated or open ports can be included.

The lighting control circuit 416 can be configured to drive a plurality of 'slave' lights 414(1)-414(N) configured to draw one or more of power, lighting level, and inactivate/deactivate commands from a multi-functional unit 204(1)-204(M). Because individual lighting units will typically be much higher in number and thus density than a multi-functional unit 204(1)-204(M), some control functionalities for a number of individual light fixtures can be converged at the multi-functional unit 204(1)-204(M). Depending upon the distance between the slave lights 414(1)-414(N) from a multi-functional unit 204(1)-204(M), the multi-functional unit 204(1)-204(M) may serve as a power supply for selected slave lights 414(1)-414(N). Other slave fixtures may only be connected, for example, to accept lighting level and activation commands. Such fixtures can draw power from alternative power sources within the deployment site.

The multi-functional units 204(1)-204(M) disclosed herein can support wired applications such as an HDMI transmitter for distribution of video to user devices or other devices within a coverage area 411. In this embodiment, a multi-functional unit 204(1)-204(M) can include an Ethernet switch 573 for connecting to internal and external devices.

Inclusion of an Ethernet switch in and a multi-functional unit 204(1) enables data and power (e.g. Power over Ethernet) connections to many compatible devices. These devices can be internal to the multi-functional unit 204(1)-204(M) or external with access via, for example, RJ45 ports exposed to the outside of the fixture. Similarly, external optical interfaces can be provided to connect to devices requiring very high bandwidth. External devices can also be connected via active optical cable.

Multi-functional units 204(1)-204(M) can include a controller 574, such as a processor, that controls one or more of the multi-functional unit 204(1)-204(M) components. The controller 574 can also communicate with control functions in the central communications circuit 202 to effect remote instructions to the multi-functional units 204(1)-204(M).

Figure 6:
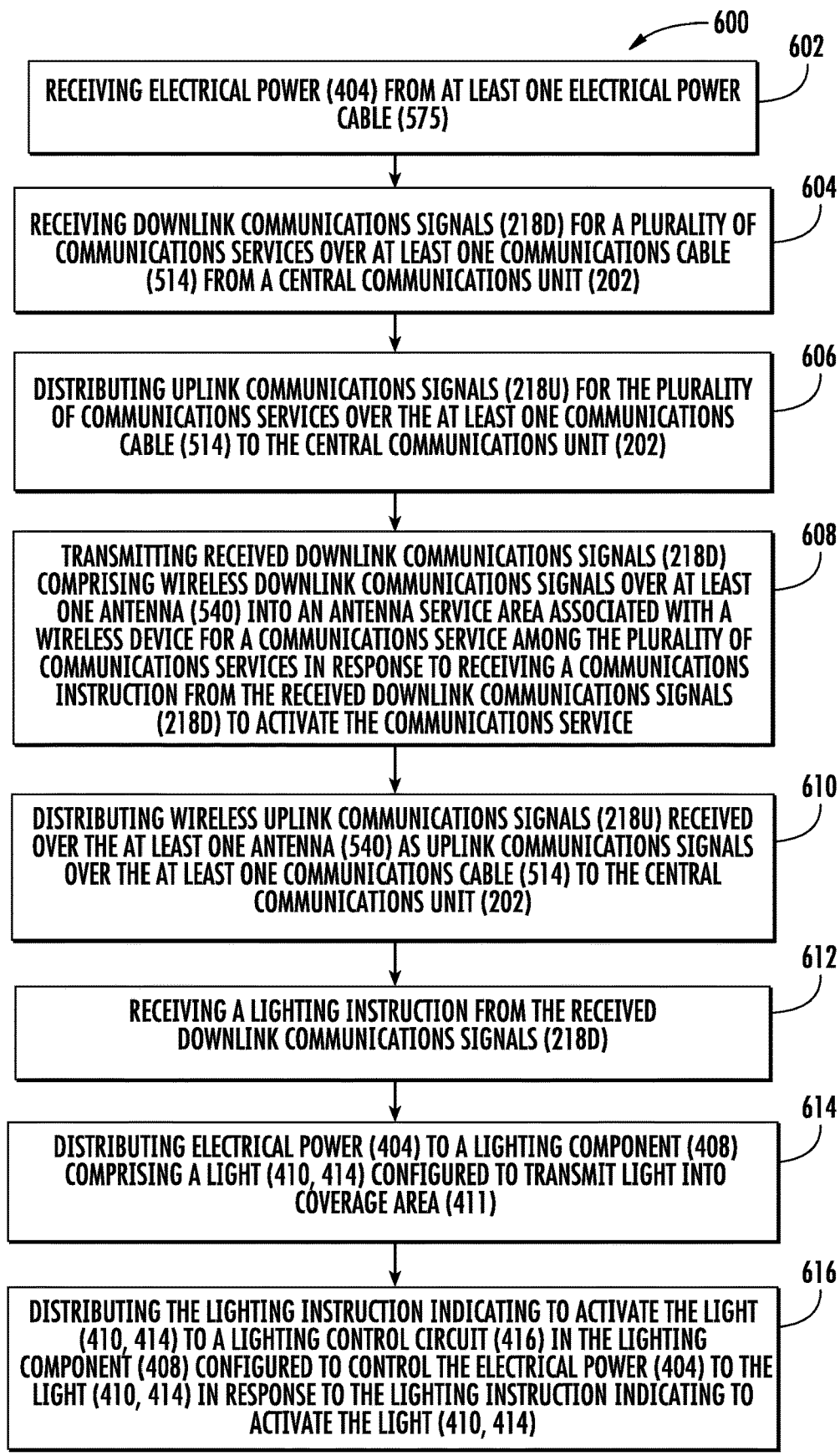
FIG. 6 is a flowchart illustrating an exemplary process of distributing multiple communications signals and power to the multi-functional units in the converged network supported by the WDS of FIG. 5 to support multiple communications services and lighting being provided at the remote locations of the multi-functional units.

FIG. 6 is a flowchart illustrating an exemplary process 600 of distributing multiple communications signals and power to the multi-functional units 204(1)-204(M) in the converged network 400 supported by the WDS 200 in FIG. 5 to support multiple communications services and lighting being provided at the remote locations of the multi-functional units 204(1)-204(M). In this regard, the process 600 includes a multi-functional unit 204(1)-204(M) receiving electrical power 404 from at least one electrical conducting power cable 575 (block 602). The process 600 also includes a multi-functional unit 204(1)-204(M) receiving downlink communications signals 218D for a plurality of communications services over at least one communications cable 514 from a central communications circuit 202 (block 604). The process 600 also includes a multi-functional unit 204(1)-204(M) distributing uplink communications signals 218U for the plurality of communications services over the at least one communications cable 514 to the central communications circuit 202 (block 606). The process 600 also includes a multi-functional unit 204(1)-204(M) transmitting received downlink communications signals 218D comprising wireless downlink communications signals over at least one antenna 540 into an antenna service area associated with a wireless device for a communications service among the plurality of communications services in response to receiving a communications instruction from the received downlink communications signals 218D to activate the communications service (block 608). The process 600 also includes a multi-functional unit 204(1)-204(M) distributing wireless uplink communications signals 218U received over the at least one antenna 540 as uplink communications signals over the at least one communications cable 514 to the central communications circuit 202 (block 610). The process 600 also includes a multi-functional unit 204(1)-204(M) receiving a lighting instruction from the received downlink communications signals 218D (block 612). The process 600 also includes a multi-functional unit 204(1)-204(M) distributing electrical power 404 to a lighting component 408 comprising a light 410, 414 configured to transmit light into a coverage area 411 (block 614). The process 600 also includes distributing the lighting instruction indicating to activate the light 410, 414 to a lighting control circuit 416 in the lighting component 408 configured to control the electrical power 404 to the light 410, 414 in response to the lighting instruction indicating to activate the light 410, 414 (block 616).

FIG. 7A is a diagram of a site plan 700 showing the site layout of an exemplary WDS 702 that supports a converged wireless communications network for a plurality of multi-functional units incorporating lighting capabilities located at the network edge in remote locations. The WDS 702 may be the WDS 200 in FIGS. 2-5. The WDS 200 includes multiple multi-functional units 204(1)-204(M) that are serviced over the communications cables 514(1)-514(M) to support converged communications and lighting services.

Figure 8A:
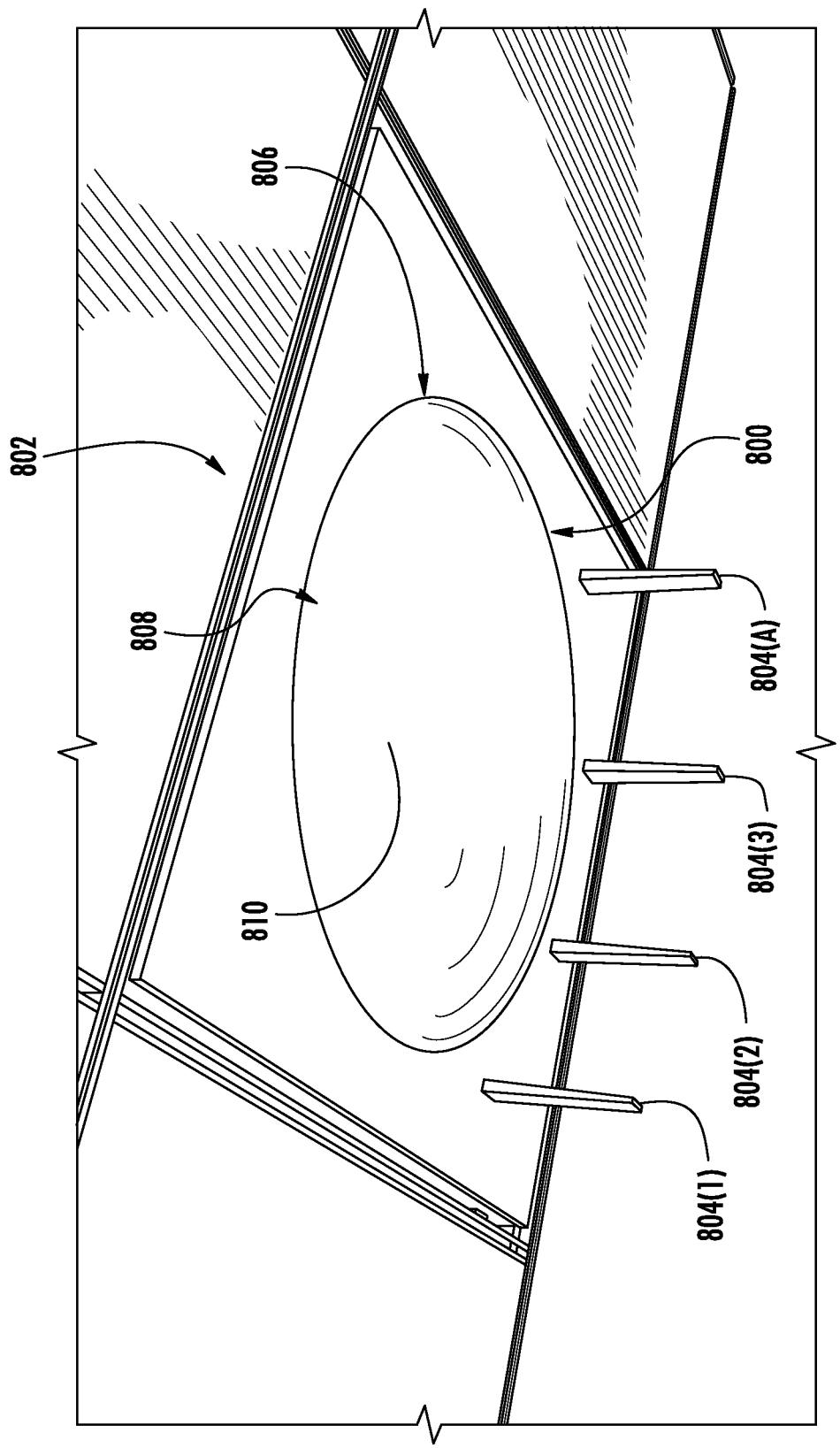
FIG. 8A is a schematic diagram of an exemplary multi-functional unit installed in a ceiling of a building with exposed antennas.
Figure 8C:
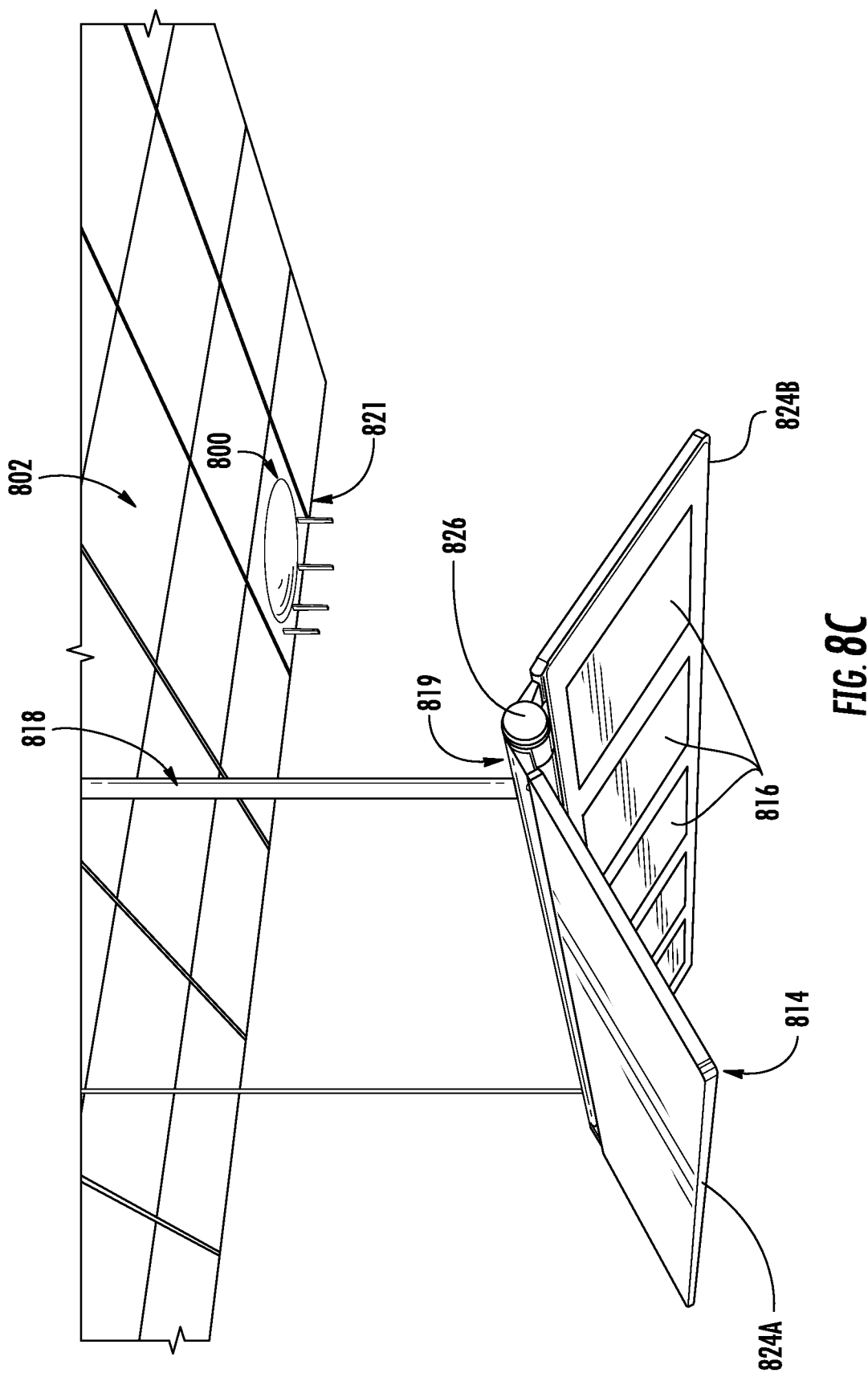
FIG. 8C is a schematic diagram of the multi-functional unit of FIG. 8A with a separate light fixture extending from the ceiling in a downward bent position and communicatively coupled to the multi-functional unit to receive communications signals and/or power form the multi-functional unit.
Figure 8D:
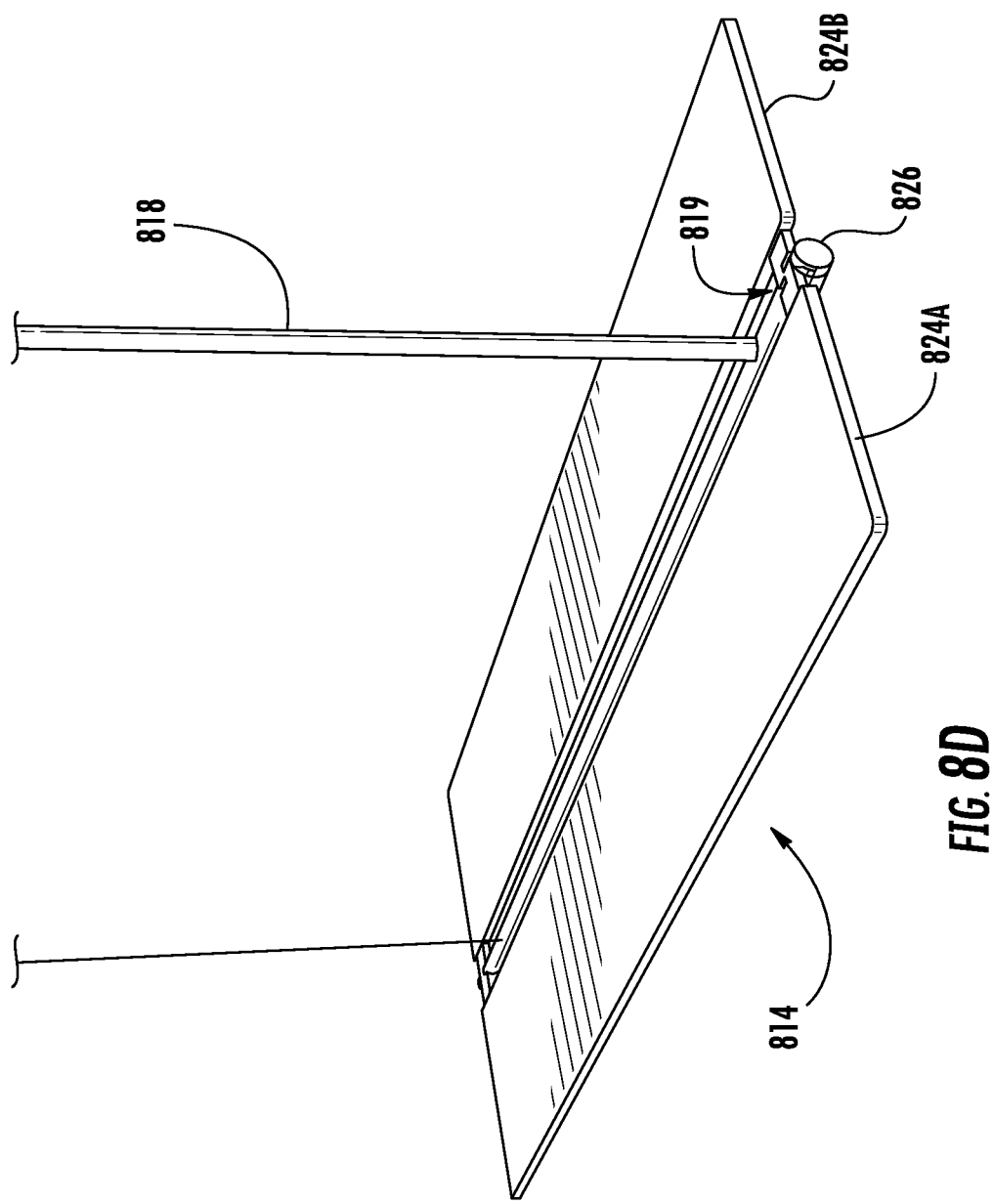
FIG. 8D is a schematic diagram of the multi-functional unit of FIG. 8C with the light fixture rotated in a flat position.

The multi-functional units 204(1)-204(M) in the WDS 200 in FIGS. 2-5 can be provided in different forms and options. For example, FIG. 8A is a schematic diagram of an exemplary multi-functional unit 800 installed in a ceiling 802 of a building with exposed antennas 804(1)-804(A). The antennas 804(1)-804(A) could be the antennas 540 in FIG. 5. The multi-functional unit 800 is concealed within the ceiling 802 as part of a light fixture 806 that includes a lighting component 808 that includes a light 810 that can be controlled by the multi-functional unit 800. The antennas 804(1)-804(A) are employed to provide wireless communications services. FIG. 8B shows the multi-functional unit 800 with the light fixture 806 removed that shows housing 812 of the multi-functional unit 800. FIG. 8C illustrates another view of the multi-functional unit 800 installed in the ceiling 802 where a lighting fixture 814 is provided separate and located apart from the multi-functional unit 800. The lighting fixture 814 is electrically coupled to the multi-functional unit 800 via a hub power cable 818 to receive electrical power. The lighting fixture 814 in this example can also include a lighting control circuit 819 to interface with a communications interface circuit 821 in the multi-functional unit 800 to receive downlink communications signals for controlling a plurality of lights 816 in the lighting fixture 814. The lighting control circuit 819 may be the lighting control circuit 416 in the multi-functional unit 204 in FIGS. 4 and 5. The communications interface circuit 821 may be a communications interface circuit 418 in the multi-functional unit 204 in FIGS. 4 and 5. The lighting fixture 814 contains the lights 816 that are disposed on opposite facing light panels 824A, 824B that form a second housing, wherein the light panels 824A, 824B are configured to rotate about a central rod 826 to angle the lights 816 as needed or desired. For example, FIG. 8D shows the lighting fixture 814 with the light panels 824A, 824B folded flat.

Figure 9A:
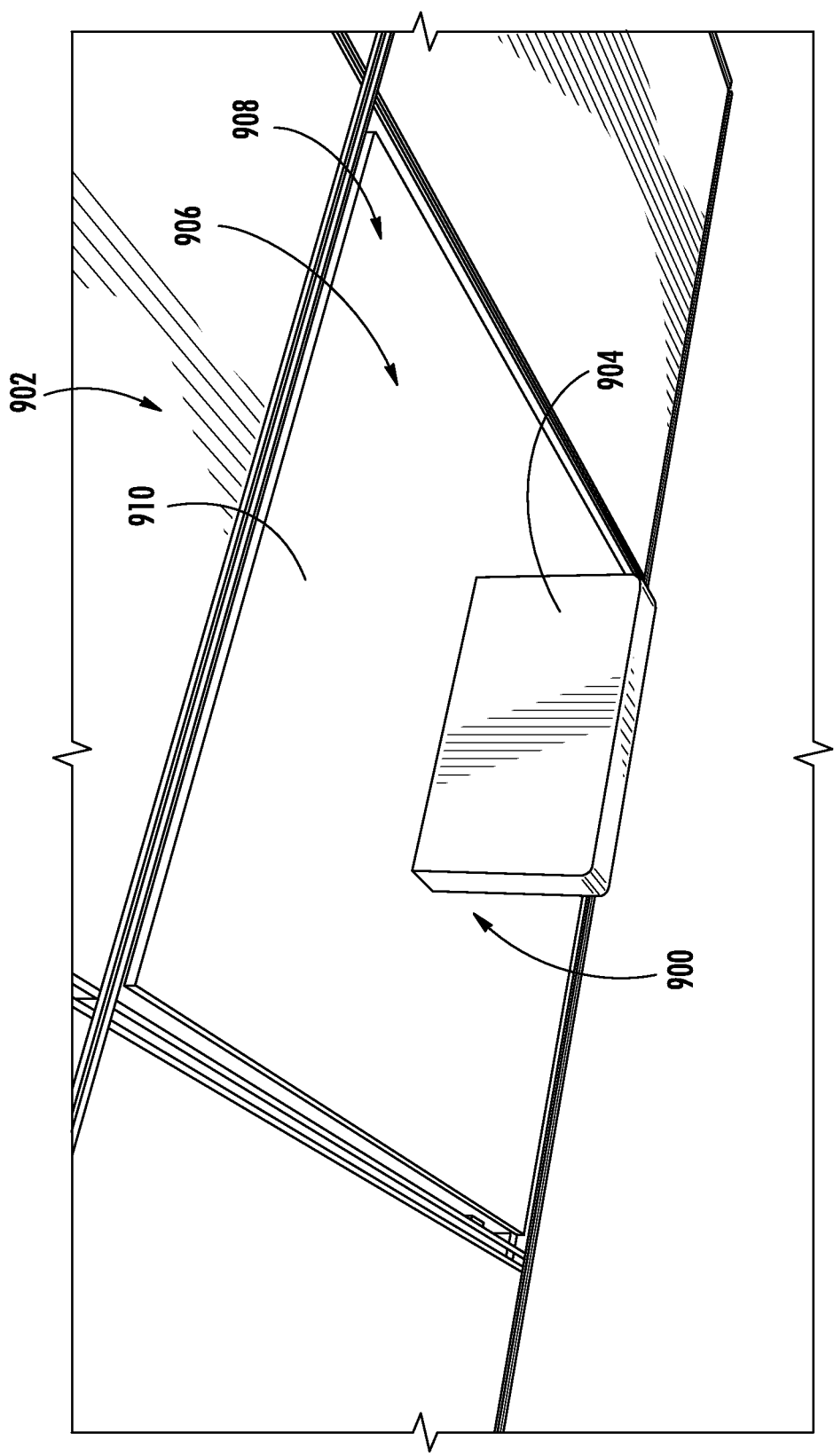
FIG. 9A is a schematic diagram of an exemplary multi-functional unit installed in a ceiling of a building with a separate antenna housing that houses wireless communications antennas exposed from the ceiling.
Figure 9B:
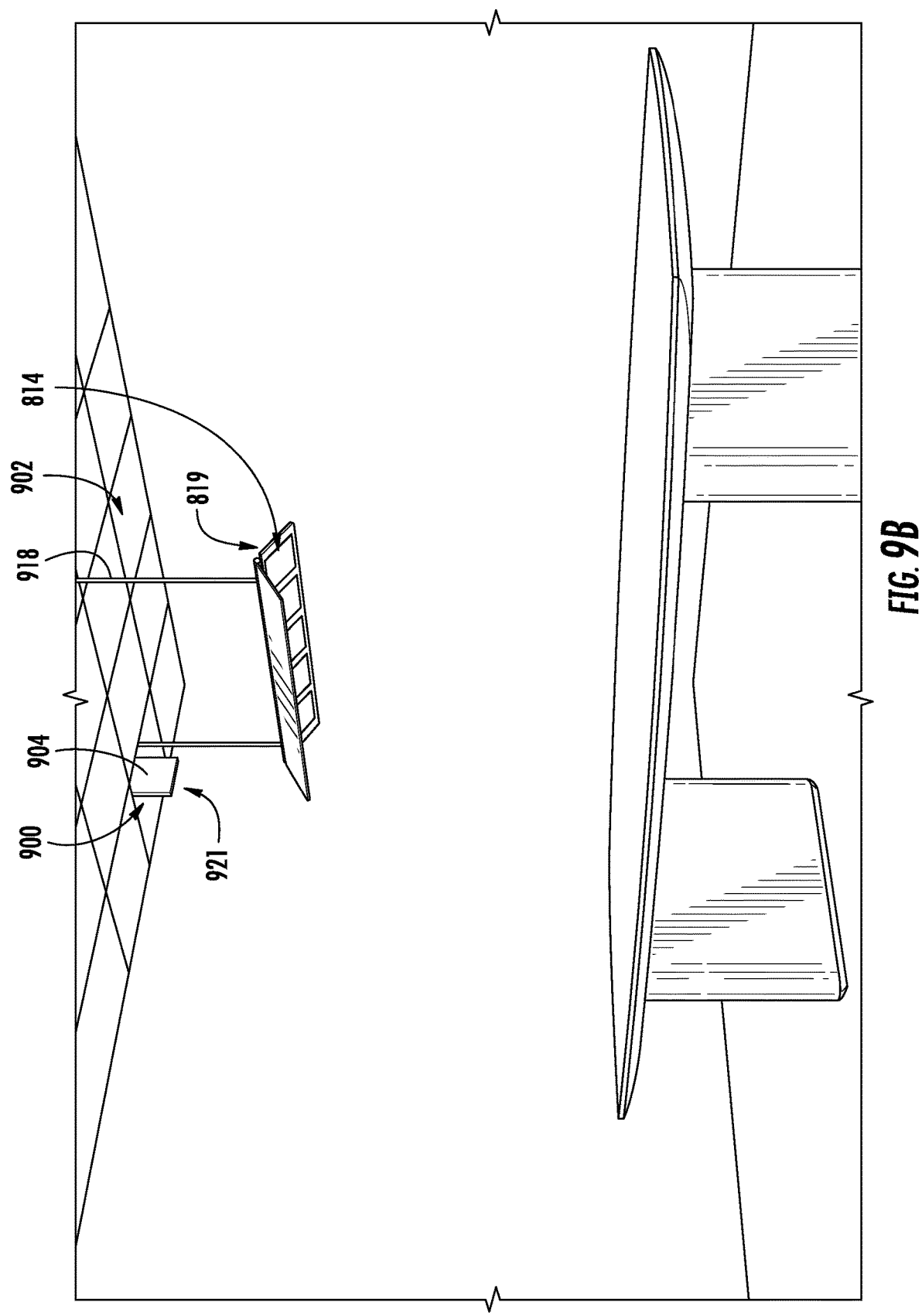
FIG. 9B is a schematic diagram of the multi-functional unit of FIG. 9A with a separate light fixture extending from the ceiling and communicatively coupled to the multi-functional unit to receive communications signals and/or power from the multi-functional unit.

FIG. 9A is a schematic diagram of another exemplary multi-functional unit 900 installed in a ceiling 902 of a building with an antenna unit 904 that may house and conceal multiple antennas (not shown). These antennas could be the antennas 540 in FIG. 5. Except for the antenna unit 904, the multi-functional unit 900 is concealed within the ceiling 902 as part of a lighting fixture 906 that includes a lighting component 908 that includes a light 910 that can be controlled by the multi-functional unit 900. The antennas in the antenna unit 904 are employed to provide wireless communications services. FIG. 9B also illustrates the multi-functional unit 900 installed in the ceiling 902 of a building with an antenna unit 904 and the lighting fixture 814 in FIGS. 8A-8D provided separately and located apart from the multi-functional unit 900. The lighting fixture 814 is electrically coupled to the multi-functional unit 900 via a power cable 918. The lighting control circuit 819 is configured to interface with a communications interface circuit 921 in the multi-functional unit 900 to receive downlink communications signals for controlling lights 816 in the lighting fixture 814. The communications interface circuit 921 may be a communications interface circuit 418 in the multi-functional unit 204 in FIGS. 4 and 5. FIG. 9C is a schematic diagram of the multi-functional unit 900 in FIG. 9A with an additional environmental circuit 554 as part of the multi-functional unit 900 installed and exposed on a canopy member 920 in the ceiling 902, wherein the canopy member 920 supports the lighting fixture 814 hanging from the ceiling 902.

Other WDSs, including an optical fiber-based WDS can be provide to support a converged wireless communication network for a plurality of multi-functional units incorporating lighting capabilities located at the network edge in remote locations, including without limitation the multi-functional units 204(1)-204(M) previously described with regard to FIGS. 2-5.

Figure 10:
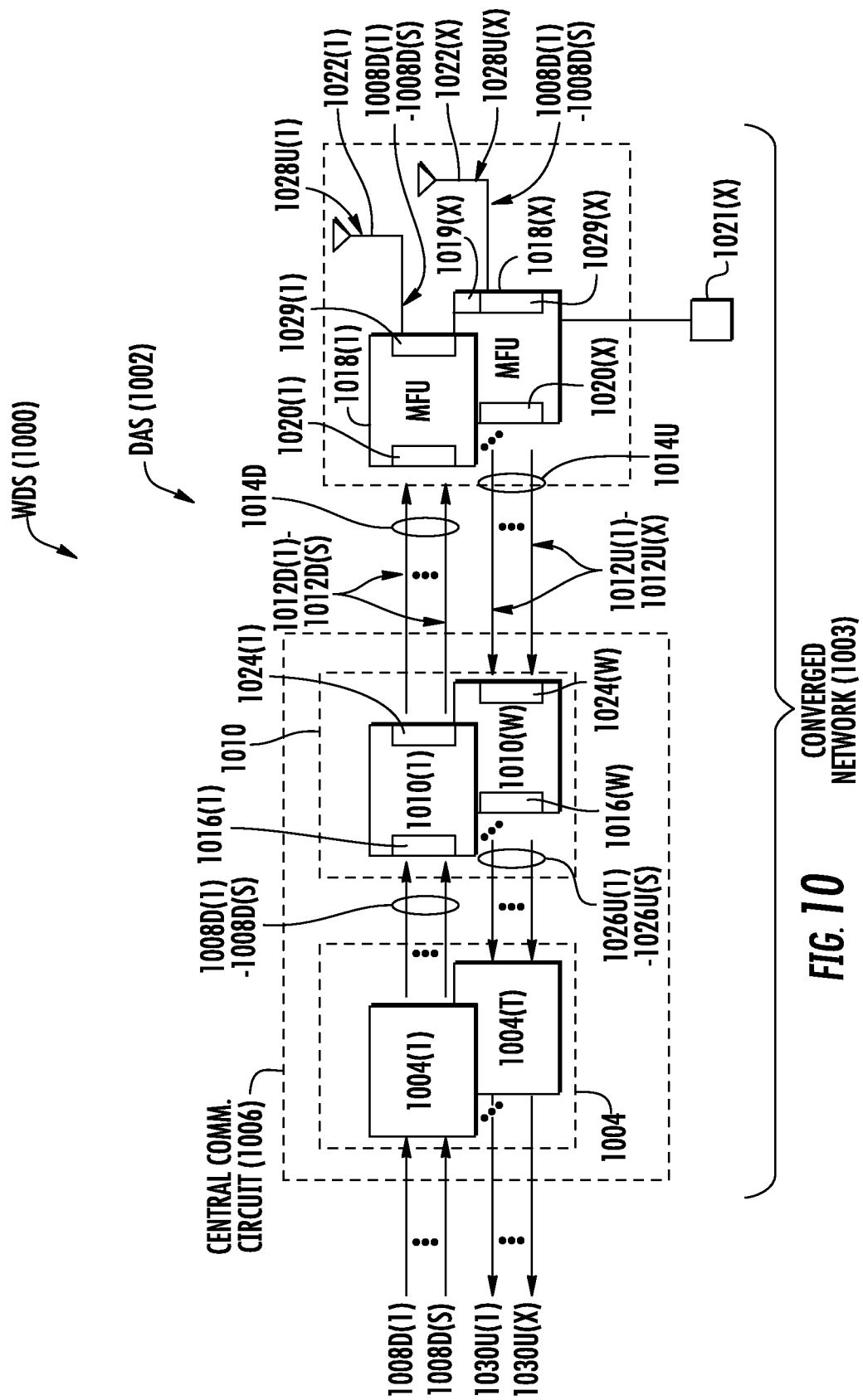
FIG. 10 is a schematic diagram of an exemplary optical fiber-based WDS that supports a converged network for a plurality of multi-functional units incorporating lighting capabilities located at a network edge in remote locations.

In this regard, FIG. 10 is a schematic diagram of an exemplary optical fiber-based WDS 1000 that supports a converged wireless communication network for a plurality of multi-functional units incorporating lighting capabilities located at the network edge in remote locations. The WDS 1000 in FIG. 10 is provided in the form of a distributed antenna system (DAS) 1002 as one example. The DAS 1002 forms a converged network 1003. A DAS is a system that is configured to distribute communications signals, including wireless communications signals, from a central communications circuit to a plurality of remote units over physical communications media. In this example, the remote units can be multi-functional units, including the multi-functional units 204(1)-204(M) previously described with regard to FIGS. 2-5. As will be discussed below, the remote units include antennas. The remote units distribute the received communications signals wirelessly to client devices in wireless communication range of a multi-functional unit.

The DAS 1002 in this example in FIG. 10 is an optical fiber-based DAS that is comprised of three (3) main components. One or more interface circuits provided in the form of radio interface circuits (RICs) 1004(1)-1004(T) are provided in a central communications circuit 1006 to receive and process (e.g., filter, amplify, route) electrical downlink communications signals 1008D(1)-1008D(S) prior to optical conversion into optical downlink communications signals. The electrical downlink communications signals 1008D(1)-1008D(S) may be received from a base transceiver station (BTS) or baseband unit (BBU) as examples. The electrical downlink communications signals 1008D(1)-1008D(S) may be analog signals or digital signals that can be sampled and processed as digital information. The radio interface circuits 1004(1)-1004(T) provide both downlink and uplink interfaces for signal processing. The notations "1-T" indicates that any number of the referenced component, 1-T, respectively, may be provided.

With continuing reference to FIG. 10, the central communications circuit 1006 is configured to accept the radio interface circuits 1004(1)-1004(T) as modular components that can easily be installed and removed or replaced in a chassis. In one embodiment, the central communications circuit 1006 is configured to support up to twelve (12) radio interface circuits 1004(1)-1004(12). Each radio interface circuit 1004(1)-1004(T) can be designed to support a particular type of radio source or range of radio sources (i.e., frequencies) to provide flexibility in configuring the central communications circuit 1006 and the DAS 1002 to support the desired radio sources. For example, one radio interface circuit 1004 may be configured to support the Personal Communication Services (PCS) radio band. Another radio interface circuit 1004 may be configured to support the 700 MHz radio band. In this example, by inclusion of these radio interface circuits 1004, the central communications circuit 1006 could be configured to support and distribute communications signals, including those for the communications services and communications bands described above as examples.

The radio interface circuits 1004(1)-1004(T) may be provided in the central communications circuit 1006 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the received electrical downlink communications signals 1008D(1)-1008D(S) are provided to a plurality of optical interfaces provided in the form of optical interface circuits 1010(1)-1010(W) in this embodiment to convert the electrical downlink communications signals 1008D(1)-1008D(S) into optical downlink communications signals 1012D(1)-1012D(W). The notation "1-W" indicates that any number of the referenced component 1-W may be provided. The optical interface circuits 1012 may include one or more optical interface components (OICs) that contain E/O converters 1016(1)-1016(W) to convert the received electrical downlink communications signals 1008D(1)-1008D(S) into the optical downlink communications signals 1012D(1)-1012D(S). The optical interface circuits 1010 support the radio bands that can be provided by the radio interface circuits 1004, including the examples previously described above. The optical downlink communications signals 1012D(1)-1012D(S) are communicated over an optical downlink fiber communications cable 1014D to a plurality of multi-functional units 1018(1)-1018 (X) provided in the form of remote antenna units in this example. The optical downlink fiber communications cable 1014D may include one or more communications cables. The optical downlink fiber communications cable 1014D may also include electrical conductors such as a hybrid cable configured to carry electrical power to the multi-functional units 1018(1)-1018(X). The notation "1-X" indicates that any number of the referenced component 1-X may be provided. One or more of the optical downlink communications signals 1012D(1)-1012D(S) can be distributed to each multi-functional unit 1018(1)-1018(X). Thus, the distribution of the optical downlink communications signals 1012D(1)-1012D(S) from the central communications circuit 1006 to the multi-functional units 1018(1)-1018(X) is in a point-to-multipoint configuration in this example. Each multi-functional unit 1018(1)-1018(X) may include a lighting component that is configured to transmit a light in response to receiving a lighting instruction in a received optical downlink communications signal 1012D(1)-1012D(S). For example, FIG. 10 shows the multi-functional unit 1018(X) that contains a light 1019(X) configured to receive electrical power to transmit a light into a coverage area. The multi-functional unit 1018(X) may also be coupled to one or more slave lights 1021(X) that are configured to receive electrical power to transmit a light into a coverage area in response to the multi-functional unit 1018(X) receiving a lighting instruction to activate the slave light 1021(X).

With continuing reference to FIG. 10, the multi-functional units 1018(1)-1018(X) include O/E converters 1020(1)-

1020(X) configured to convert the one or more received optical downlink communications signals 1012D(1)-1012D(S) back into the electrical downlink communications signals 1008D(1)-1008D(S) to be wirelessly radiated through antennas 1022(1)-1022(X) in the multi-functional units 1018(1)-1018(X) to user equipment (not shown) in the reception range of the antennas 1022(1)-1022(X). The optical interface circuits 1010 may also include O-E converters 1024(1)-1024(W) to convert received optical uplink communications signals 1012U(1)-1012U(X) from the multi-functional units 1018(1)-1018(X) into electrical uplink communications signals 1026U(1)-1026U(S) as will be described in more detail below.

With continuing reference to FIG. 10, the multi-functional units 1018(1)-1018(X) are also configured to receive electrical uplink communications signals 1028U(1)-1028U(X) received by the respective antennas 1022(1)-1022(X) from client devices in wireless communication range of the multi-functional units 1018(1)-1018(X). The electrical uplink communications signals 1028U(1)-1028U(S) may be analog signals or digital signals that can be sampled and processed as digital information. The multi-functional units 1018(1)-1018(X) include E-O converters 1029(1)-1029(X) to convert the received electrical uplink communications signals 1028U(1)-1028U(X) into optical uplink communications signals 1012U(1)-1012U(X). The multi-functional units 1018(1)-1018(X) distribute the optical uplink communications signals 1012U(1)-1012U(X) over an optical uplink fiber communications cable 1014U to the optical interface circuits 1010(1)-1010(W) in the central communications circuit 1006. The O-E converters 1024(1)-1024(W) convert the received optical uplink communications signals 1012U(1)-1012U(X) into the electrical uplink communications signals 1026U(1)-1026U(X), which are processed by the radio interface circuits 1004(1)-1004(T) and provided as electrical uplink communications signals 1030U(1)-1030U(X) to a source transceiver such as a base transceiver station (BTS) or baseband unit (BBU).

Note that the optical downlink fiber communications cable 1014D and the optical uplink fiber communications cable 1014U coupled between the central communications circuit 1006 and the multi-functional units 1018(1)-1018(X) may be a common optical fiber communications link, wherein for example, wave division multiplexing (WDM) may be employed to carry the optical downlink communications signals 1012D(1)-1012D(S) and the optical uplink communications signals 1012U(1)-1012U(X) on the same optical fiber communications link. Alternatively, the optical downlink fiber communications cable 1014D and the optical uplink fiber communications cable 1014U coupled between the central communications circuit 1006 and the multi-functional units 1018(1)-1018(X) may be single, separate optical fiber communications links, wherein for example, wave division multiplexing (WDM) may be employed to carry the optical downlink communications signals 1012D(1)-1012D(S) on one common optical downlink fiber and the optical uplink communications signals 1012U(1)-1012U(X) carried on a separate, only optical uplink fiber. Alternatively, the optical downlink fiber communications cable 1014D and the optical uplink fiber communications cable 1014U coupled between the central communications circuit 1006 and the multi-functional units 1018(1)-1018(X) may be separate optical fibers dedicated to and providing a separate communications link between the central communications circuit 1006 and each multi-functional unit 1018(1)-1018(X).

Figure 11:
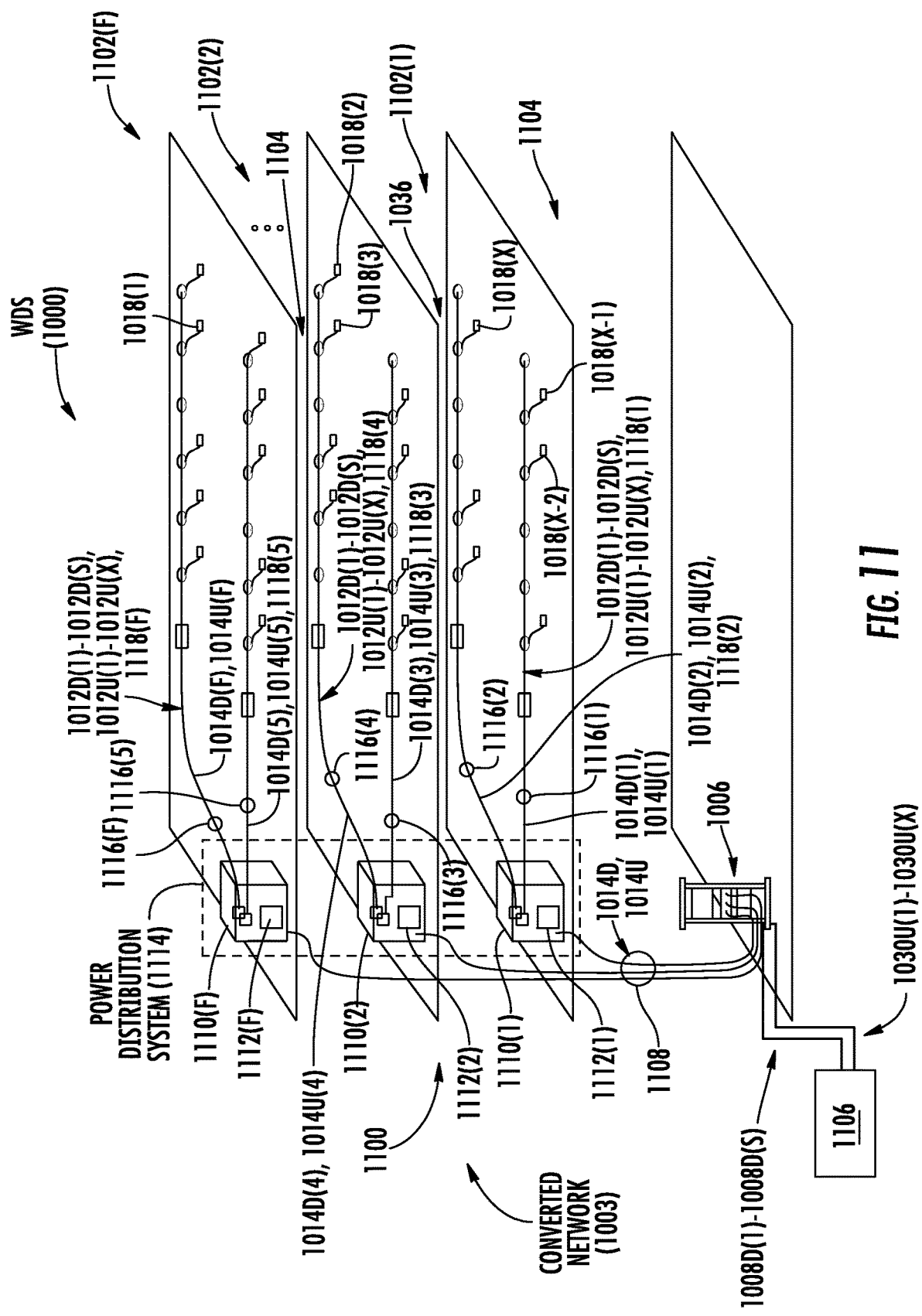
FIG. 11 is a partially schematic cut-away diagram of a building infrastructure employing the WDS of FIG. 10 that supports a converged network for a plurality of multi-functional units incorporating lighting capabilities located at a network edge in remote locations.

A WDS that supports a converged wireless communication network for a plurality of multi-functional units incorporating lighting capabilities located at the network edge in remote locations, including the WDS 1000 in FIG. 10, can be installed in an indoor environment as illustrated in FIG. 11. FIG. 11 is a partially schematic cut-away diagram of a building infrastructure 1100 employing the WDS 1000 in FIG. 10. With reference to FIG. 11, the building infrastructure 1100 in this embodiment includes a first (ground) floor 1102(1), a second floor 1102(2), and a Fth floor 1102(F), where 'F' can represent any number of floors. The floors 1102(1)-1102(F) are serviced by the central communications circuit 1006 to provide antenna coverage areas 1104 in the building infrastructure 1100. The antenna coverage area 1104 is the distance in which wireless communications signals can be transmitted or otherwise distributed at a minimum signal-to-noise ratio (SNR) to achieve communications with a client device. The central communications circuit 1006 is communicatively coupled to a signal source 1106, such as a BTS or BBU, to receive the electrical downlink communications signals 1008D(1)-1008D(S). The central communications circuit 1006 is communicatively coupled to the multi-functional units 1018(1)-1018(X) to receive optical uplink communications signals 1012U(1)-1012U(X) from the multi-functional units 1018(1)-1018(X) as previously described in FIG. 10. The optical downlink and uplink communications signals 1012D(1)-1012D(S), 1012U(1)-1012U(X) are distributed between the central communications circuit 1006 and the multi-functional units 1018(1)-1018(X) over a riser cable 1108 in this example. The riser cable 1108 may be routed through interconnect units (ICUs) 1110(1)-1110(F) dedicated to each floor 1102(1)-1102(F) for routing the optical downlink and uplink communications signals 1012D(1)-1012D(S), 1012U(1)-1012U(X) to the multi-functional units 1018(1)-1018(X). The ICUs 1110(1)-1110(F) may also include respective power distribution circuits 1112(1)-1112(F) that include power sources as part of a power distribution system 1114, wherein the power distribution circuits 1112(1)-1112(F) are configured to distribute power remotely to the multi-functional units 1018(1)-1018(X) to provide power for operating the power consuming components in the multi-functional units 1018(1)-1018(X). For example, array cables 1116(1)-416(F) may be provided and coupled between the ICUs 1110(1)-410(F) that contain both optical fibers to provide the respective optical downlink and uplink fiber communications cable 1014D(1)-1014D(F), 1014U(1)-1014U(F) and electrical power conductors 1118(1)-1118(F) (e.g., electrical wire) to carry current from the respective power distribution circuits 1112(1)-1112(F) to the multi-functional units 1018(1)-1018(X).

Figure 12:
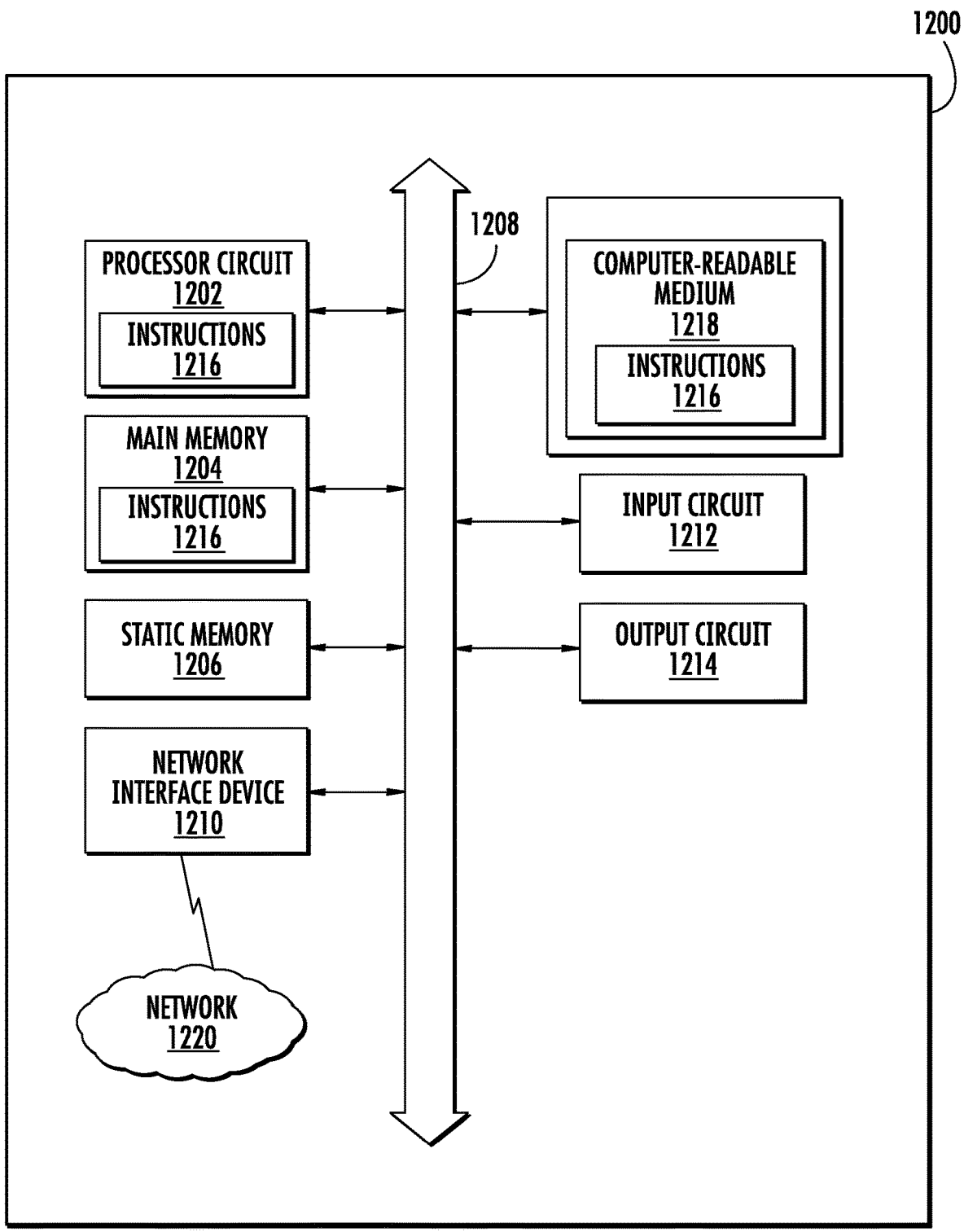
FIG. 12 is a schematic diagram representation of additional detail illustrating an exemplary computer system that could be employed in a control circuit in networks as disclosed herein.

FIG. 12 is a schematic diagram representation of additional detail illustrating an exemplary computer system 1200 that could be employed in any of the circuits in the converged networks disclosed herein that include a plurality of multi-functional units incorporating lighting capabilities located at the network edge in remote locations. For example, the exemplary computer system 1200 could be employed in the multi-functional units 204(1)-204(M) previously described with regard to FIGS. 2-5, and/or any other circuits in the converged network 400 or WDS 200 described with regard to FIGS. 2-5 to perform their exemplary features and functions disclosed herein. In this regard, the computer system 1200 in FIG. 12 may include a set of instructions that may be executed. The computer system 1200 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1200 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. The exemplary computer system 1200 in this embodiment includes a processing device or processor circuit 1202 (e.g., a CPU, a CPU core, a microprocessor, a micro-controller, a dedicated function asynchronous circuit (ASIC)), a main memory 1204 (e.g., read-only memory (ROM), flash memory, dynamic random access memory (DRAM), such as synchronous DRAM (SDRAM), etc.), and a static memory 1206 (e.g., flash memory, static random access memory (SRAM), etc.), which may communicate with each other via a data bus 1208. Alternatively, the processor circuit 1202 may be connected to the main memory 1204 and/or the static memory 1206 directly or via some other connectivity means. The main memory 1204 or the static memory 1206 may be any type of memory.

The processor circuit 1202 represents one or more general-purpose processing devices, such as a microprocessor, central processing unit, or the like. More particularly, the processor 1202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1202 is configured to execute processing logic in instructions for performing the operations and steps discussed herein.

The computer system 1200 may further include a network interface device 1210. The computer system 1200 also may or may not include an input circuit 1212, configured to receive input and selections to be communicated to the computer system 1200 when executing instructions. The computer system 1200 also may or may not include an output circuit 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processor circuit 1202 during execution thereof by the computer system 1200, the main memory 1204 and the processor circuit 1202 also constituting computer-readable medium. The instructions 1216 may further be transmitted or received over a network 1220 via the network interface device 2110.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A converged network for supporting lighting and communications services, comprising:
    a plurality of electrical conducting power cables and a plurality of communications cables;
    a central communications unit configured to distribute downlink communications signals over the plurality of communications cables and receive uplink communications signals over the plurality of communications cables;
    a plurality of multi-functional units, at least one multi-functional unit among the plurality of multi-functional units comprising:
        at least one power interface circuit configured to be coupled to at least one electrical conducting power cable among the plurality of electrical conducting power cables to receive electrical power distributed over the at least one electrical conducting power cable;
    a plurality of wireless communications circuits each comprising at least one antenna configured to transmit the downlink communications signals comprising wireless downlink communications signals received from at least one communications cable among the plurality of communications cables from the central communications unit into an antenna service area associated with a wireless device, and distribute wireless uplink communications signals received over the at least one antenna as the uplink communications signals over at least one communications cables among the plurality of communications cables to the central communications unit; and a lighting component comprising a light and configured to receive the electrical power to transmit the light into a coverage area of the at least one multi-functional unit, the lighting component comprising a lighting control circuit configured to:
  receive a lighting instruction distributed in a received downlink communications signal from the at least one communications cable among the plurality of communications cables from the central communications unit; and
  control the electrical power received from the at least one power interface circuit to the light in response to the lighting instruction.

2. The converged network of claim 1, wherein the central communications unit comprises a network management circuit including at least one switch controlling communications between the network management circuit and the plurality of multi-functional units.

3. The converged network of claim 1, wherein the central communications unit comprises a head-end circuit configured to distribute the downlink communications signals over the plurality of communications cables to the plurality of multi-functional units and to receive the uplink communications signals over the plurality of communications cables from the plurality of multi-functional units.

4. The converged network of claim 3, wherein the head-end wireless communications circuit comprises a plurality of electrical-to-optical (E/O) converters configured to convert downlink communications signals comprising electrical downlink communications signals into optical downlink communications signals, and a plurality of optical-to-electrical (O/E) converters configured to convert received uplink communications signals comprising optical uplink communications signals into electrical uplink communications signals.

5. The converged network of claim 1, wherein the central communications unit further comprises a building control circuit comprising an environmental control circuit configured to distribute the lighting instruction in a downlink communications signal over the at least one communications cable to at least one multi-functional unit to cause the lighting control circuit to distribute the electrical power to the lighting component to a light level according to the lighting instruction.

6. The converged network of claim 2, wherein the at least one communications cable among the plurality of communications cables coupled to the at least one multi-functional unit comprises a continuous optical path from the central communications unit to the at least one multi-functional unit.

7. The converged network of claim 2, wherein each communications cable among the plurality of communications cables forms a separate continuous optical path from the central communications unit to a coupled multi-functional unit among the plurality of multi-functional units.

8. The converged network of claim 1, further comprising at least one interconnect unit (ICU) coupled to the at least one multi-functional unit, the at least one ICU comprising a power circuit configured to draw the electrical power at or adjacent to the at least one ICU and to distribute the electrical power over at least one electrical conducting power cable to the at least one multi-functional unit.

9. The converged network of claim 8, wherein the at least one ICU is configured to distribute direct current (DC) power over the at least one electrical conducting power cable to the at least one multi-functional unit.

10. The converged network of claim 8, wherein the at least one power interface circuit is configured to receive the electrical power over the at least one electrical conducting power cable coupled to the at least one ICU.

11. The converged network of claim 1, wherein the at least one power interface circuit is configured to receive the electrical power over the at least one electrical conducting power cable from a power source at or adjacent to the coverage area of the at least one multi-functional unit.

12. The converged network of claim 1, wherein at least one wireless communications circuit among one or more wireless communications circuits comprises at least one wireless access point.

13. The converged network of claim 1, wherein at least one wireless access point comprises at least one Wi-Fi access point.

14. The converged network of claim 1, wherein at least one wireless communications circuit of the one or more wireless communications circuits comprises at least one small cell radio circuit configured to transmit mobile telephone wireless downlink communications signals and receive mobile telephone wireless uplink communications signals.

15. The converged network of claim 1, wherein at least one wireless communications circuit of the one or more wireless communications circuits comprises at least one remote antenna unit for a distributed antenna system (DAS).

16. The converged network of claim 1, wherein at least one wireless communications circuit of the one or more wireless communications circuits comprises at least one location-based services circuit configured to obtain location data of the at least one multi-functional unit.

17. The converged network of claim 1, wherein the at least one multi-functional unit further comprises:
  at least one communications interface circuit configured to be coupled to at least one communications cable among the plurality of communications cables,
  the at least one communications interface circuit configured to receive the downlink communications signals for a plurality of communications services over the at least one communications cable from the central communications unit, and distribute the uplink communications signals for the plurality of communications services over the at least one communications cable to the central communications unit.

18. The converged network of claim 17, further comprising at least one Ethernet switch communicatively coupled to at least one communications interface circuit among one or more communications interface circuits.

19. The converged network of claim 17, further comprising at least one radio frequency (RF) beacon circuit communicatively coupled to at least one communications interface circuit among the one or more communications interface circuits.

20. The converged network of claim 17, further comprising at least one temperature sensing circuit communicatively coupled to at least one communications interface circuit among the one or more communications interface circuits.

21. The converged network of claim 17, further comprising at least one camera communicatively coupled to at least one communications interface circuit among the one or more communications interface circuits.

22. The converged network of claim 17, further comprising at least one wireless docketing station circuit communicatively coupled to at least one communications interface circuit among the one or more communications interface circuits.

23. The converged network of claim 17, further comprising at least one air quality sensor circuit communicatively coupled to at least one communications interface circuit among the one or more communications interface circuits.

24. The converged network of claim 1, further comprising at least one wireless powering transmitter circuit coupled to at least one power interface circuit among a plurality of power interface circuits.

25. The converged network of claim 1, further comprising at least one occupancy sensor circuit coupled to at least one power interface circuit among the plurality of power interface circuits.

26. The converged network of claim 1, further comprising at least one computer coupled to at least one power interface circuit among the plurality of power interface circuits, the at least one computer coupled to at least one communications interface circuit among the one or more communications interface circuits.

27. The converged network of claim 1, wherein the at least one multi-functional unit further comprises an optical network terminal (ONT) component including at least one demultiplexer configured to demultiplex the received downlink communications signals and at least one multiplexer configured to multiplex the received uplink communications signals.

28. The converged network of claim 1, wherein each of the plurality of communications cables is coupled to a multi-functional unit among the plurality of multi-functional units.

29. The converged network of claim 1, wherein each of the plurality of electrical conducting power cables and the plurality of communications cables are arranged in a pair as a hybrid cable each comprising one electrical conducting power cable and one communications cable.

* * * * *